US007236128B2

(12) United States Patent
Sugar et al.

(10) Patent No.: US 7,236,128 B2
(45) Date of Patent: Jun. 26, 2007

(54) SYSTEM AND METHOD FOR LOCATING RADIO EMITTERS USING SELF-CALIBRATED PATH LOSS COMPUTATION

(75) Inventors: Gary L. Sugar, Rockville, MD (US); Yohannes Tesfai, Silver Spring, MD (US)

(73) Assignee: Cognio, Inc., Germantown, MD (US)

( * ) Notice: Subject to any disclaimer, the term of this patent is extended or adjusted under 35 U.S.C. 154(b) by 326 days.

(21) Appl. No.: 10/976,509

(22) Filed: Oct. 29, 2004

(65) Prior Publication Data
US 2005/0285792 A1 Dec. 29, 2005

Related U.S. Application Data

(60) Provisional application No. 60/582,317, filed on Jun. 23, 2004.

(51) Int. Cl.
*G01S 3/02* (2006.01)
(52) U.S. Cl. .................. 342/465; 342/174; 342/463
(58) Field of Classification Search ............ 342/174, 342/463–465
See application file for complete search history.

(56) References Cited

U.S. PATENT DOCUMENTS 5,719,584 A   2/1998   Otto (Continued)

OTHER PUBLICATIONS

P. Krishnan et al., "A System for LEASE: Location Estimation Assisted by Stationary Emitters for Indoor RF Wireless Networks", IEEE INFOCOM, 2004.

S. Ganu et al., "Infrastructure-Based Location Estimation In WLAN Networks", IEEE Wireless Communication and Networking Conference, Mar. 2004.

(Continued)

*Primary Examiner*—Thomas H. Tarcza
*Assistant Examiner*—Fred H. Mull
(74) *Attorney, Agent, or Firm*—Edell, Shapiro & Finnan, LLC

(57) ABSTRACT

Techniques for reducing the complexity and improving the accuracy of receive signal strength based location systems. The system comprises a plurality of radio sensor devices placed at known positions within a space in which devices are to be located. According to one technique, the path loss is measured between all combinations of pairs of radio sensor devices based on a test signal transmitted by each radio sensor device. A path loss model is evaluated to compute modeled path loss data between all combinations of pairs of radio sensor devices. For each measured path loss, a path loss error relative to each radio sensor device is computed by taking the difference between the measured path loss and the modeled path loss. The path loss error relative to each radio sensor device at any candidate position is interpolated from the computed path loss errors. A path loss estimate between a candidate position and each radio sensor device is computed by adding the interpolated path loss error relative to that radio sensor device at the candidate position and path loss data obtained by evaluating the path loss model based on the distance between at each candidate position and the corresponding radio sensor device. When determining the position of a device emitting radio signals (called a target device), the improved path loss estimate is used. According to another technique, for each radio sensor device, parameters are derived for a path loss model function from the measured path loss between that radio sensor device and each of the other radio sensor devices using a minimization computation. Then, a path loss estimate between a position and each radio sensor device is computed by evaluating the path loss model function using the parameters derived for each radio sensor device.

56 Claims, 12 Drawing Sheets

U.S. PATENT DOCUMENTS

| | | | |
|---|---|---|---|
| 5,977,913 | A | 11/1999 | Christ .................... 342/465 |
| 6,340,928 | B1 | 1/2002 | McCurdy .................. 340/436 |
| 6,493,629 | B1 | 12/2002 | Van Bosch ................ 701/207 |
| 6,674,403 | B2 | 1/2004 | Gray et al. ............... 342/463 |
| 6,952,181 | B2 * | 10/2005 | Karr et al. ............... 342/450 |
| 6,990,428 | B1 * | 1/2006 | Kaiser et al. ............. 342/450 |
| 2004/0072577 | A1 | 4/2004 | Petri et al. ............. 455/456.1 |
| 2004/0087316 | A1 | 5/2004 | Caci |
| 2004/0203841 | A1 | 10/2004 | Bayder |
| 2005/0176406 | A1 * | 8/2005 | Krishnakumar et al. .... 455/410 |

OTHER PUBLICATIONS

M. Youssef, "WLAN Location Determination via Clustering and Probability Distribution", IEEE Percom, Mar. 2003.

A. Agrawala, "Location and Time In Wireless Environments", UMD MIND Lab Presentation, 2003.

P. Bahl et al., "RADAR: An In-Building RF-Based User Location and Tracking System", IEEE Infocom, Mar. 2000.

P. Bahl et al., "Enhancements to the RADAR User Location and Tracking System", Microsoft Research Technical Report, Feb. 2000.

P. Prasithsangaree et al., "On Indoor Position Location With Wireless LANs", IEEE PIMRC Conference, 2002.

Christ et al., "A Prison Guard Duress Alarm Location System", Proc. IEEE International Carnahan Conference on Security Technology, Oct. 1993.

Kaemarungsi et al., "Modeling of Indoor Positioning Systems Based on Location Fingerprinting ," IEEE Infocom, Hong Kong, Mar. 2004.

Gwon et al., "Robust Indoor Location Estimation of Stationary and Mobile Users," IEEE Infocom, Hong Kong, Mar. 2004.

M. Youssef et al., "On the Optimality of WLAN Location Determination Systems," Communication Networks and Distributed Systems Modeling and Simulation Conference, Jan. 18-24, 2004, San Diego, California.

Howard et al., "An Experimental Study of Localization Using Wireless Ethernet", International Conference on Field and Service Robotics, 2003.

Tao et al., "Wireless LAN location-sensing for security applications", Wireless Security Workshop, 2003.

Teemu Tonteri., "A Statistical Modeling Approach to Location Estimation," Master's Thesis, University of Helsinki, Department of Computer Science, May 25, 2001.

Battiti et al., "Statistaical Learning Theory for Location Fingerprinting in Wireless LANs," Technical Report DIT-02-0086, 2002.

P. Myllymaki et al., "A Probabilistic Approach to WLAN User Location Estimation," The Third IEEE Workshop on Wireless LANs, 2001.

Calvert, "Wireless Location Determination: Using Existing 802.11 Wireless Networks to Determine a User's Location," UCR, 2004.

* cited by examiner

Lmeas($\mathbf{u}_{sens(i)}$, $\mathbf{u}_{sens(j)}$)

Path Loss Estimate $\hat{L}(\mathbf{u}, \mathbf{u}_{sens(j)}) = \text{Lmode}(\mathbf{u}, \mathbf{u}_{sens(j)}) + \text{Interp}(\mathbf{u}, \mathbf{u}_{sens(1)}, \cdots, \mathbf{u}_{sens(N)}, \mathbf{e}_j)$ $j^{th}$ Sensor Position ($\mathbf{u}_{sens(j)}$)

SYSTEM AND METHOD FOR LOCATING RADIO EMITTERS USING SELF-CALIBRATED PATH LOSS COMPUTATION

This application claims priority to U.S. Provisional Application No. 60/582,317, filed Jun. 23, 2004, the entirety of which is incorporated herein by reference.

BACKGROUND OF THE INVENTION

Technology for determining the location or position of devices that emit radio signals has the potential to provide a wide variety of location-specific applications. For example, in cellular telephone communication networks, the ability to locate a cellular telephone is a critical requirement of emergency (e911) responder systems. Such location systems employ location techniques, many of which are suitable for cellular telephone applications where location precision is not a requirement.

Radio location techniques for indoor radio applications, such as wireless local area networks (WLANs), require generally higher location precision. Some of these location technologies use time-of-arrival (TOA) or time-difference-of-arrival (TDOA) with respect to signals emitted by the device to be located. Other location technologies rely on receive signal strength or path loss between the device to be located and reference devices at known positions that receive the signal emitted by the device.

There is room for improving the accuracy and reliability of location systems that use path loss information to determine the location of a device that emits radio signals detected by other devices at known positions. In particular, some receive signal strength location techniques heretofore known require laborious user assisted calibration of the system by physically walking a transmitter throughout the entire area of interest. Other techniques require numerous transmitter devices placed at known positions in order to assist in calibrating the system. This increases the cost of the system. Furthermore, some systems require imported coverage maps that require a user to manually import information about a space of interest using a software tool that requires the user to trace over a floor plan with a mouse, and to add to that data information describing walls, obstructions, etc.

SUMMARY OF THE INVENTION

Techniques are described herein for reducing the complexity and improving the accuracy of receive signal strength based location systems. The system comprises a plurality of radio sensor devices placed at known positions within a space in which positions of devices are to be estimated. The path loss is measured between all combinations of pairs of radio sensor devices based on a test signal transmitted by each radio sensor device. A path loss model is evaluated to compute modeled path loss data between all combinations of pairs of radio sensor devices. For each measured path loss, a path loss error relative to each radio sensor device is computed by taking the difference between the measured path loss and the modeled path loss. The path loss error relative to each radio sensor device at any candidate position is interpolated from the computed path loss errors. A path loss estimate between a candidate position and each radio sensor device is computed by adding the interpolated path loss error relative to that radio sensor device at the candidate position and path loss data obtained by evaluating the path loss model based on the distance between each candidate position and the corresponding radio sensor device.

Another technique is provided for generating path loss estimate data. Test signals are transmitted between each radio sensor devices, and a path loss is measured at each of the other radio sensor devices to measure the path loss between all combinations of pairs of radio sensor devices. For each radio sensor device, parameters are derived for a path loss model function from the measured path loss between that radio sensor device and each of the other radio sensor devices using a minimization computation. Then, a path loss estimate between a position and each radio sensor device is computed by evaluating the path loss model function using the parameters derived for each radio sensor device.

Position estimation procedures are provided for estimating the position of a device emitting radio signals (called a target device) using the path loss estimate data derived by either of the methods described above. Techniques are also provided to use historical data pertaining to estimated transmit power of a target device when computing a position of that target device in conditions where there is position ambiguity.

Other radio position techniques are described herein that can be used with the path loss estimation techniques described above, or with any other path loss computation techniques heretofore known or hereinafter developed.

DETAILED DESCRIPTION

The position/location estimation system and method described herein uses received signal strength (RSS) of the signal emitted by the device to be located (target device) and does not require the aforementioned laborious offline calibration or imported coverage maps. The algorithm may be implemented in two phases, an offline phase for sensor self-calibration, and an online phase for real-time position estimation.

The System in General

Figure 1:
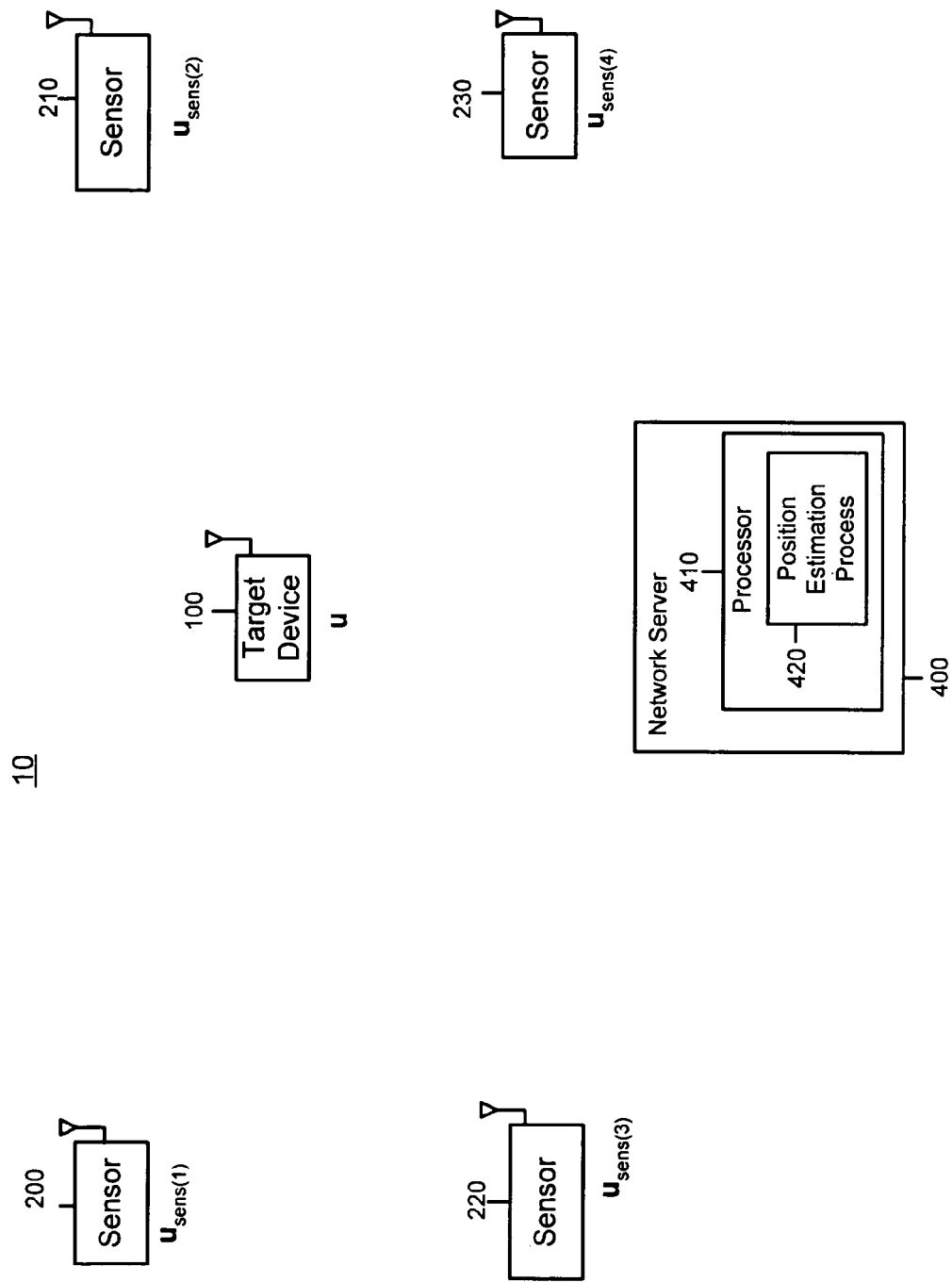
FIG. 1 is a block diagram of a location system.

With reference to FIG. 1, a system 10 is shown comprising a plurality of radio sensor devices (sensors) 200, 210, 220 and 230 and a server computer 400. The sensors are deployed at known positions. Sensors can both transmit and receive signals from each other and receive signals from the device to be located, called a target device 100. For example, sensor 200 is at position $u_{sens1}$, sensor 210 is at position $u_{sens2}$, sensor 220 is at position $u_{sens3}$ and sensor 230 is at position $u_{sens4}$. An example of a sensor is described hereinafter in conjunction with FIGS. 12 and 13. The target device 100 is the device to be located and is at an unknown position u. Sensors 200-230 connect to the server 400 via either a wired or wireless connection. The number of sensors may vary with the particular physical environment in which the location process is to be executed. However, it is desirable to make the cost of the sensors as low as possible so that more can be deployed without a significant system cost impact.

The server 400 includes a processor 410 that executes a position estimation process 420 that includes both the self-calibration offline phase and the online position estimation phase.

The techniques described herein are applicable to many applications where the target device emits radio energy. For example, the target device may be a wireless communication device that transmits a signal according to a wireless communication protocol that the sensors also recognize and operate on. In this sense, one or more sensors may initiate an exchange of signals with the target device in order to solicit transmissions from it, from which RSS measurements can be made at the sensors. An example of such a protocol is an IEEE 802.11 WLAN protocol. A sensor may transmit a data packet that the target device responds to with an acknowledgment message. Alternatively, a request-to-send/clear-to-send exchange may be initiated by a sensor. However, it is not necessary that a sensor initiate an exchange with the target device. The sensors may simply listen for transmissions or emissions from the target device. Moreover, the target device may be a device that emits radio energy that is not consistent or the same as the wireless communication protocol used by the sensors. For example, the target device may be a device that emits energy that interferes with the operation of IEEE 802.11 WLAN, such as a microwave oven, Bluetooth™ device, cordless telephone, wireless video camera, etc.

Theory of Operation

Let U be a random vector (2- or 3-dimensions) denoting the unknown target position, and let R be a random vector denoting the RSS information from the sensors. The following is a model for the dependence of R on U:

$$R = P_{Tx} \cdot 1 - [L(U, u_{sens(1)}) \ldots L(U, u_{sens(N)})]^T + N$$

where $P_{Tx}$ represents the (unknown) target transmit power in dBm, $u_{sens(i)}$ is the (known) position of the ith sensor for i=1 to N, 1 is the all-ones column vector, N is a vector of lognormal AWGN samples in dB to represent lognormal fading and shadowing, and $L(U, u_{sens(i)})$ represents the path loss between sensor(i) and the position U, not accounting for effects of fading or shadowing. An improvement to this model that takes into account the receiver noise floor of each sensor is $$R = 10\log_{10}[10^{0.1(P_{Tx} \cdot 1 - [L(U,u_{sens(1)}), \ldots, L(U,u_{sens(N)})])} + 10^{0.1 \cdot NF}] + N \quad (1)$$

where NF is the (known) noise floor in dBm at each sensor.

Given an RSS observation r, the position estimation algorithm picks the most likely position u* over all candidate positions and transmit powers, i.e., $$u_* = \arg\max_u \max_{P_{Tx}} Pr(U = u \mid R = r) \quad (2)$$

If the candidate positions are equally likely and the components of the AWGN vector N have equal variance, it is straightforward to show that (2) is equivalent to:

$$u_* = \arg\min_u \min_{P_{Tx}} \|r - \tilde{r}(u, P_{Tx})\|^2, \quad (3)$$

where $$\tilde{r}(u, P_{Tx}) \triangleq 10\log_{10}\left[10^{0.1(P_{Tx} \cdot 1 - [L(u,u_{sens(1)}), \ldots, L(u,u_{sens(N)})]^T)} + 10^{0.1 \cdot NF}\right] \quad (4)$$

The actual path loss $L(u, u_{sens(j)})$ between position u and sensors(j) is unknown, but an estimate $\hat{L}$ can be obtained by employing an indoor path loss model to generate a rough estimate of the path loss, and an additive correction term to get the model to agree with the measured path loss data at the sensor locations. This technique is described in detail below.

Let Lmodel($u_1$, $u_2$)=PathLossFunc($\|u_1 - u_2\|$) denote an estimate of the path loss between two arbitrary positions $u_1$ and $u_2$ based on a path loss model. The path loss model is implemented in the function PathLossFunc and uses only the distance between the two positions to estimate the path loss. One example of an indoor path loss model is described in "900 MHz Path Loss Measurements and Prediction Techniques for In-Building Communication System Design," Seidel, et al., Proc. 41st IEEE VTC Conference, 1991. This path loss model can be expressed as follows:

Path Loss $[dB] = P1[dB] + 27.6 \cdot \log_{10}(d)$, where d is the distance between the emitter and the receiver, and P1 is the path loss at 1 meter which depends on transmit and receive antenna gains, and the frequency of the target transmit signal.

Another path loss model is described in "Coexistence between Bluetooth and IEEE 802.11 CCK Solutions to Avoid Mutual Interference", A. Kamerman, Lucent Technologies Bell Laboratories, January 1999. This path loss model uses a line-of-sight assumption (path loss coefficient=2.0) for the first 8 meters, and a larger path loss coefficient beyond 8 meters to account for walls, etc.:

Path Loss $[dB] = P1$ $[dB] + 20 \cdot \log_{10}(d)$ if $d < 8$ m

Path Loss $[dB] = P1$ $[dB] + 20 \cdot \log_{10}(8) + 33 \cdot \log_{10}(d/8)$ otherwise.

Still another path loss model approach is to assume a two-coefficient model of the form:

Path Loss $[dB] = C_0 + C_1 \cdot \log_{10}(d)$, and to solve for the $c_0$ and $c_1$ that form a best-fit line through the measured path loss data from the sensor self-calibration measurements. For example, a single-breakpoint model may be defined as follows:

$$L_{model}(d) = \begin{cases} C_0 + 10 \cdot C_1 \cdot \log_{10}(d) & \text{if } d < d_0 \\ C_0 + 10 \cdot C_1 \cdot \log_{10}(d_0) + 10 \cdot C_2 \cdot \log_{10}\left(\frac{d}{d_0}\right) & \text{otherwise} \end{cases}$$

where $d_0$ is the breakpoint distance in meters, $C_0$ is the path loss at 1 meter, $C_1$ is the path loss slope for distances under $d_0$ meters, and $C_2$ is the path loss slope beyond $d_0$ meters.

Moreover, multiple path loss models may be used. For example, one path loss model may be used for areas with low obstruction densities (e.g., open areas or hallways), another path loss model for high obstruction densities (cubicles, walls, etc). The specific $C_0$, $C_1$ and $C_2$ values for these parameters at 2.4 GHz were found empirically and are listed below:

Low Obstruction Density: $C_0$=20 dB, $C_1$=2.0 dB/meter, $C_2$=2.3 dB/meter

High Obstruction Density: $C_0$=40 dB, $C_1$=2.0 dB/meter, $C_2$=3.3 dB/meter

Continuing with the development for the path loss estimate $\hat{L}$, let E be the path loss error matrix defined by $$E_{i,j}=[e_1 \ldots e_N]^T = \text{Lmeas}(u_{sens(i)}, u_{sens(j)}) - \text{Lmodel}(u_{sens(i)}, u_{sens(j)})$$

where $\text{Lmeas}(u_{sens(i)}, u_{sens(j)})$ is the measured path loss between sensor(i) and sensors)(j) when sensor(j) receives a test signal from sensor(i). When i=j, $\text{Lmeas}(u_{sens(i)}, u_{sens(j)})$ =0. The measurement assumes that averaging is performed (ideally with antenna diversity and/or with frequency diversity by transmitting a broadband signal during calibration) during the measurement to mitigate the effects of fading or shadowing. Note that with an appropriate amount of averaging, it is reasonable to assume that the measured path loss and the actual path loss are the same, i.e., $\text{Lmeas}(u_{sens(i)}, u_{sens(j)})=L(u_{sens(i)}, u_{sens(j)})$.

The jth column of the path loss error matrix defined above, $e_j$, represents the error between the path loss model and the actual (measured) path loss, when the path loss is measured at each of the sensor positions relative to sensor (j). For convenience, $e_j$ is referred to as "the path loss error relative to sensor (j)."

Figure 2:
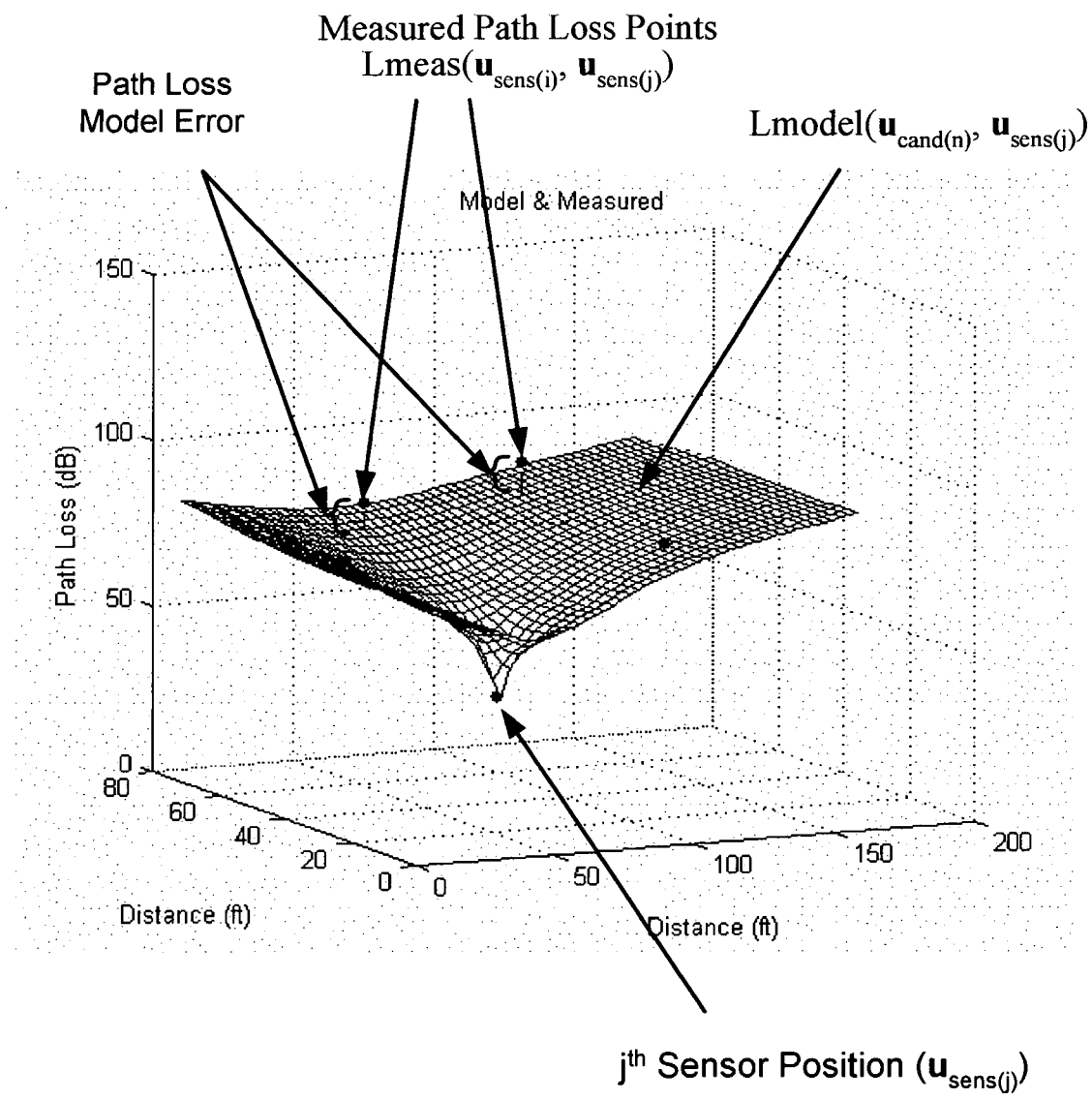
FIGS. 2-4 are diagrams illustrating forms of path loss derived between an arbitrary position and a sensor produced according the algorithms described herein, for the purpose of determining the position of a target device.

FIG. 2 illustrates the measured path loss between each of the sensors and sensor (j), and also the modeled path loss obtained by evaluating the path loss model PathLossFunc between candidate positions $u=u_{cand(n)}$ and $u_{sens(j)}$.

The estimate $\hat{L}$ for the path loss $L(u,u_{sens(j)})$ between position u and sensor(j) can now be defined as follows:

$$\hat{L}(u, u_{sens(j)}) \triangleq \text{Lmodel}(u, u_{sens(j)}) + \text{Interp}(u, u_{sens(1)}, \ldots, u_{sens(N)}, e_j) \quad (5)$$

Figure 3:
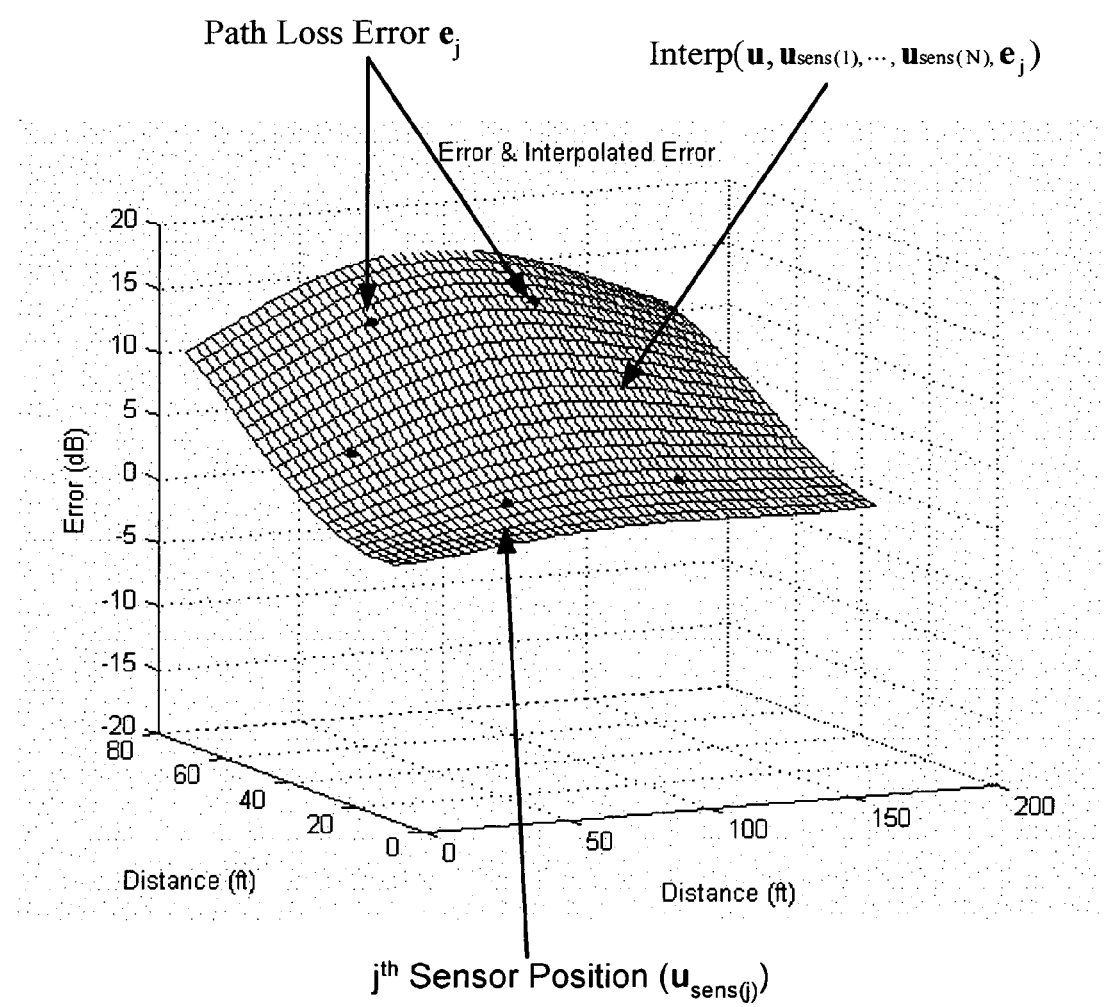
Figure 4:
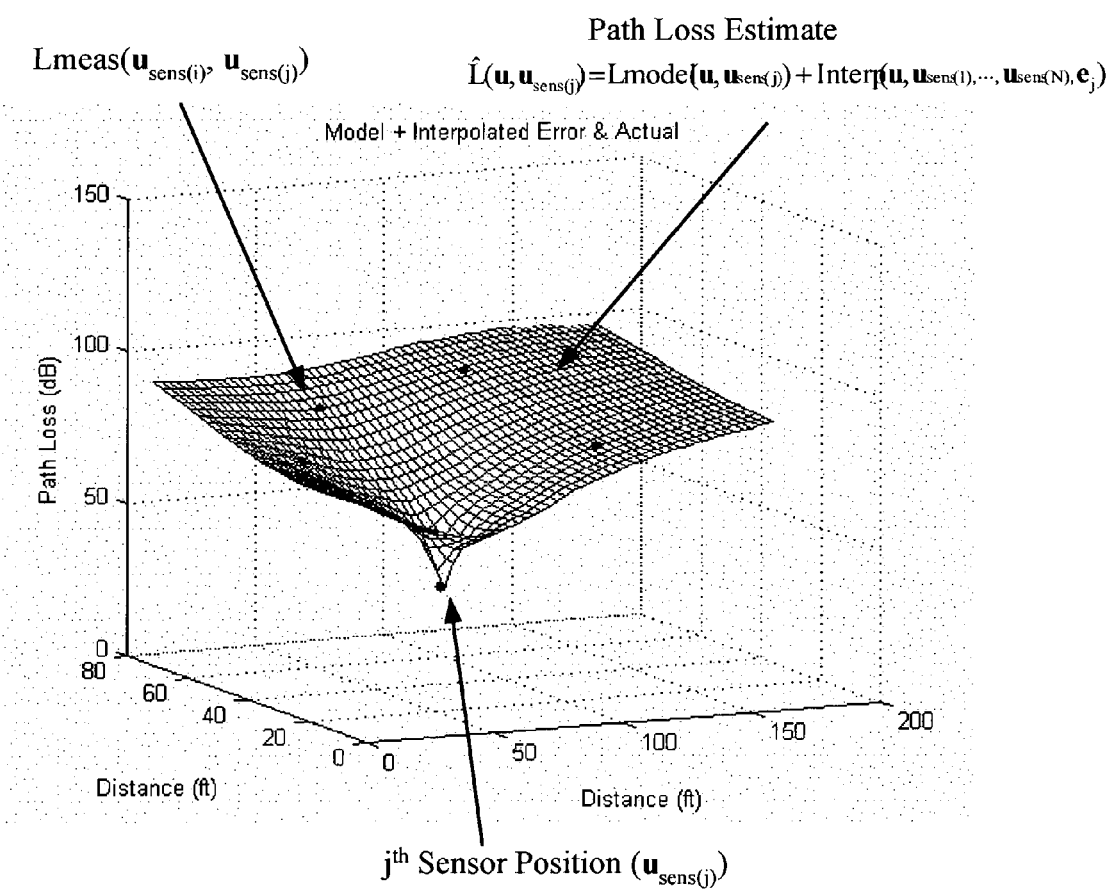

In the second term of the above equation, multi-dimensional interpolation is used to interpolate the path loss error relative to sensor (j) between the positions at which the error is known (i.e., at the sensor positions) to form an estimate of the error at position u. FIG. 3 illustrates the path loss error relative to sensor (j), $e_j$, and the interpolated path loss error relative to sensor(j), $\text{Interp}(u,u_{sens(1)}, \ldots, u_{sens(N)}, e_j)$. FIG. 4 illustrates the path loss estimate $\hat{L}(u, u_{sens(j)})$. Data of the type represented by FIGS. 2-4 is produced for each sensor (j).

One example of a multi-dimensional interpolation technique useful for the Interp( ) function is known as "Kriging", and is described in "DACE: A MATLAB Kriging Toolbox," Version 2.0, Aug. 1, 2002, Lophaven, H. Nielsen, J. Søndergaard, Department of Informatics and Modeling, Technical University of Denmark. A number of other well-known multi-dimensional interpolation techniques can be used for this application, such as Akima splines, bi-linear interpolation, etc.

Substituting $\hat{L}$ for L in equation (4), the position estimator can now be defined as follows:

$$u_* = \arg\min_u \min_{P_{Tx}} \|r - \hat{r}(u, P_{Tx})\|^2, \quad (7)$$

where $$\hat{r}(u, P_{Tx}) \triangleq 10\log_{10}\left[10^{0.1\left(P_{Tx}\cdot 1 - [\hat{L}(u,u_{sens(1)}), \ldots, \hat{L}(u,u_{sens(N)})]^T\right)} + 10^{0.1\cdot NF}\right] \quad (8)$$

The position estimation algorithm selects the candidate position u* that is associated with the closest RSS in Euclidean distance to the RSS observation vector r using equation (7). Said another way, the position estimation algorithm computes a most likely position over a plurality of candidate positions and a plurality of candidate transmit powers of the target device based on the receive signal strength data at the known sensor positions. This could be done either by evaluating equation (7) over a grid of candidate positions $u=\{u_{cand(n)}\}$, or by using an iterative multi-dimensional minimization algorithm, such as the Simplex Method, Powell's Method, or Simulated Annealing as described in Numerical Recipes in C, The Art of Scientific Computing, Press et al., Cambridge University Press, 1992.

An improvement of this process is to collect a sequence $r_n$ of RSS observations from multiple transmissions by a target device instead of a single observation. A Maximum Likelihood Sequence Estimation (MLSE) algorithm is employed to produce the following generalization of equation (7) for a sequence of observations:

$$u_* = \arg\min_u \min_{P_{Tx}} \sum_{n=1}^{N_{seq}} \|r_n - \hat{r}(u, P_{Tx})\|^2, \quad (9)$$

for a block of $N_{seq}$ observations $r_1, \ldots, r_{Nseq}$, or $$u_* = \arg\min_u \min_{P_{Tx}} LPF_n(\|r_n - \hat{r}(u, P_{Tx})\|^2), \quad (10)$$

using a bank of lowpass filters (one filter for each candidate $(u,P_{Tx})$ pair) to replace the sum in equation (5). Using this approach, the ML position estimate is the position that corresponds to the filter having the smallest output. The time constant of the filters should be small enough to give good averaging but large enough to accommodate any motion of the target.

Still another modification of the basic process is when each sensor has multiple antennas and receive antenna diversity capability. Diversity may be achieved by selection diversity or full simultaneous receive diversity (e.g., a receiver for each antenna path). RSS data is observed from multiple antennas on sensor devices from one or more transmissions (or emissions) by a target device. Using $\{r1_n\}, \ldots, \{rP_n\}$ to denote RSS observation sequences from P antennas, the MLSE estimator for the P antenna case is $$u_* = \arg\min_u \min_{P_{Tx}} \sum_{n=1}^{N_{seq}} [\|r1_n - \hat{r}(u, P_{Tx})\|^2 + \ldots + \|rP_n - \hat{r}(u, P_{Tx})\|^2], \quad (11)$$

for a block of Nseq observations, and $$u_* = \arg\min_u \min_{P_{Tx}} LPF(\|rI_n - \hat{r}(u, P_{Tx})\|^2 + \ldots + \qquad (12)$$
$$\|rP_n - \hat{r}(u, P_{Tx})\|^2),$$

using the LPF approach. In fact, equation (11) is a generalized statement of the position estimator described herein, where equation (7) is a special case of equation (11). An alternative expression for equation (9) which integrates out the unknown transmit power rather than selecting the Tx power with minimum MSE:

$$u_* = \arg\max_u \int_{P_{Tx}} \exp\left(-\sum_{n=1}^{N_{seq}} [\|rI_n - \hat{r}(u, P_{Tx})\|^2 + \ldots + \|rP_n - \hat{r}(u, P_{Tx})\|^2]/2\sigma^2\right) \cdot f_{P_{Tx}}(p_{Tx}) \cdot dp_{Tx}$$

In the above expression, $\sigma^2$ represents the noise variance of the RSS estimate (empirically, $\sigma$ has been shown to be close to 5 dB), and $f_{P_{Tx}}(p_{Tx})$ is the marginal probability density for the transmit power $P_{Tx}$. The expression to the LPF approach (8) is identical to the above expression, except the summation is replaced by an LPF operator.

With respect to equation (12), two lowpass filters, which may be referred to as "slow" and "fast" may be used in practice to track fast target movements without introducing large position estimate variations. The input RSS data is applied to both the filters to produce estimates $u^*_{slow}$ and $u^*_{fast}$. Nominally $u^*_{slow}$ is used as the final estimate of the target location. However, if the difference between the two estimates is greater than the threshold ($r_{thresh}$) $u^*_{fast}$ is used as the output and the state of the fast filter is loaded to that of the slow filter.

Another form for the position estimator is as follows:

$$u_* = \arg\min_u \min_{model} \min_{P_{Tx}} LPF(\|rI_n - \hat{r}(u, P_{Tx})\|^2 + \cdots + \qquad (13)$$
$$\|rP_n - \hat{r}(u, P_{Tx})\|^2)$$

An additional minimization step over path loss models is added in equation (13) to search over two or more two different path loss models. For example, a low obstruction density path loss model and a high obstruction density path loss model may be used as referred to above, and minimization performed as indicated in equation (13) over these two models.

System Implementation

Figure 5:
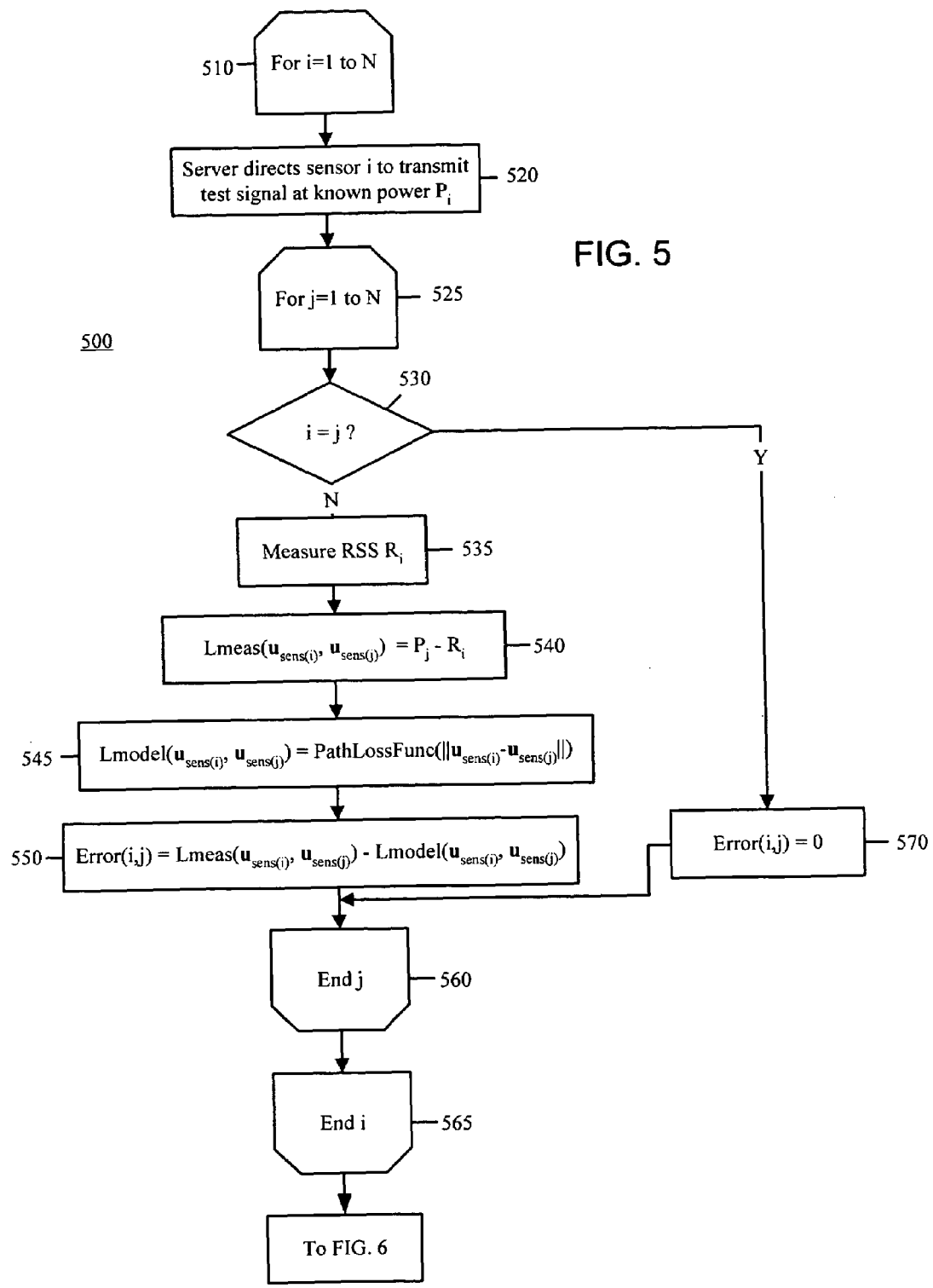
FIGS. 5 and 6 are flow charts depicting steps that may be performed to compute path loss estimate data during a self-calibration phase.
Figure 6:
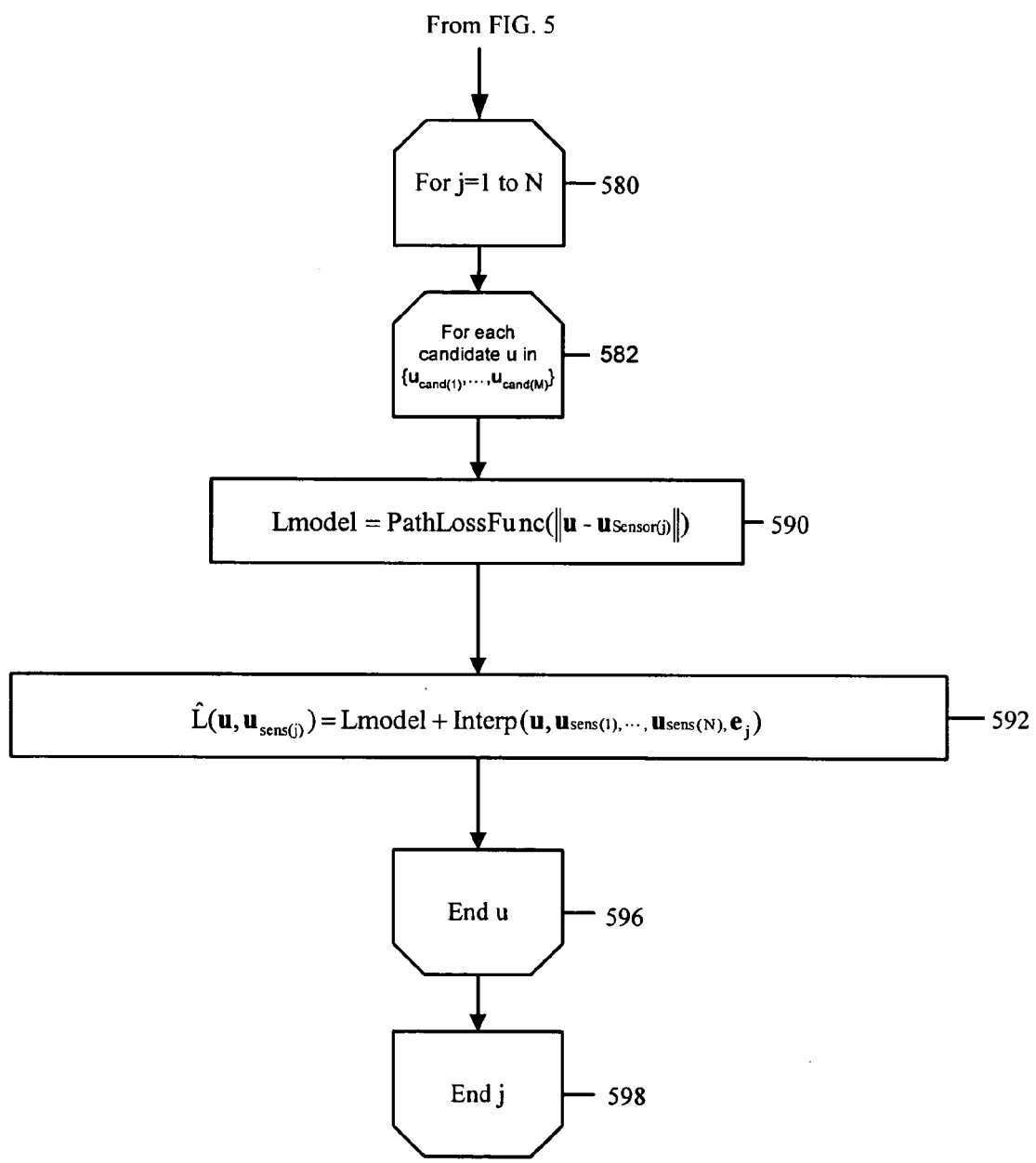

FIGS. 5 and 6 illustrate a flow chart for a self-calibration phase that may be computed "off-line", i.e., prior to (or during times other than) determining the position of a target device. Parameters computed during this phase include the measured path loss between sensors, Lmeas($u_{sens(i)}$, $u_{sens(j)}$), the modeled path loss between sensors, Lmodel($u_{sens(i)}$, $u_{sens(j)}$), and the path loss error matrix E. The ultimate output of this calibration step and the flowchart in FIG. 6 is the path loss estimate $\hat{L}(u_{cand(n)}, u_{sens(j)})$ between each sensor and a number of candidate target positions $u_{cand(n)}$.

The self-calibration process 500 begins in FIG. 5. As shown by step 510, for each sensor(i) for i=1 to N, the server in step 520 directs sensor(i) to transmit a test signal at a known power $P_i$. Then at each of the other sensors, sensors), for j=1 to N (step 525) where i is not equal to j (step 530), the received signal strength (RSS)$R_j$ is measured in step 535. Then, in step 535, given knowledge of the RSS $R_j$, a measured path loss Lmeas($u_{sens(i)}$, $u_{sens(j)}$) between sensor(i) and sensors) is computed. Next, in step 545, a path loss model PathLossFunc is evaluated for the distance between sensor(i) and sensor(j), to produce path loss model data Lmodel($u_{sens(i)}$, $u_{sens(j)}$). Then, in step 550, a path loss error Error(i,j) is computed between the measured path loss (between sensor(i) and sensors)), Lmeas($u_{sens(i)}$, $u_{sens(j)}$) and the path loss model data for distance between sensor(i) and sensors), Lmodel($u_{sens(i)}$, $u_{sens(j)}$). This process is repeated for all i, 1 to N, and all j, 1 to N, to cover each sensor acting as a source of a test signal with respect to the other sensors acting as receive devices for each test signal.

Reference is now made to FIG. 6. As shown by step 580, for j=1 to N, and step 582, for each of a plurality of candidate position u in the set of candidate positions $u_{cand(1)}$ to $u_{cand(M)}$, in step 590, the path loss function PathLossFunc is evaluated between the position of sensor(j) and each candidate position to produce path loss model data Lmodel based on the distance between sensors) and each corresponding candidate position. Next, in step 592, an interpolated path loss error relative to sensor(j), Interp(u,$u_{sens(1)}$, ..., $u_{sens(N)}$, $e_j$), is computed, and a path loss estimate $\hat{L}(u,u_{sens(j)})$ is computed between a candidate position and sensors) by adding the interpolated path loss error relative to sensors) to the path loss data, Lmodel, obtained by evaluating the path loss model based on a distance between a position of sensor(j) and the candidate position. As indicated by steps 596 and 598, for each sensors), steps 590 and 592 are repeated for all candidate positions u in the set $\{u_{cand(1)}, \ldots, u_{cand(M)}\}$ to produce a path loss estimate $\hat{L}(u_{cand(1)},u_{sens(j)}), \ldots, \hat{L}(u_{cand(M)}, u_{sens(j)})$.

The self-calibration path loss estimation process of FIGS. 5 and 6 can be summarized as a method for generating path loss estimate data associated with an area in which a plurality of radio sensor devices are deployed at known positions and used to determine a position of a target device in the area based on emissions received from the target device, the method comprising: with respect to a test signal transmitted by each radio sensor device, measuring path loss at each of the other radio sensor devices to measure the path loss between all combinations of pairs of radio sensor devices; evaluating a path loss model based on the distance between all combinations of pairs of radio sensor devices to produce path loss model data; computing, relative to each radio sensor device, a path loss error between the measured path loss and the path loss model data when the path loss is measured at each of the other radio sensor positions relative to that radio sensor device; interpolating a path loss error relative to each radio sensor device at a candidate position from the corresponding computed path loss errors; and computing a path loss estimate between a candidate position and each radio sensor device by adding the interpolated path loss error relative to a radio sensor device at the candidate position to path loss data obtained by evaluating the path loss model based on a distance between a position of the corresponding radio sensor device and the candidate position.

Figure 7:
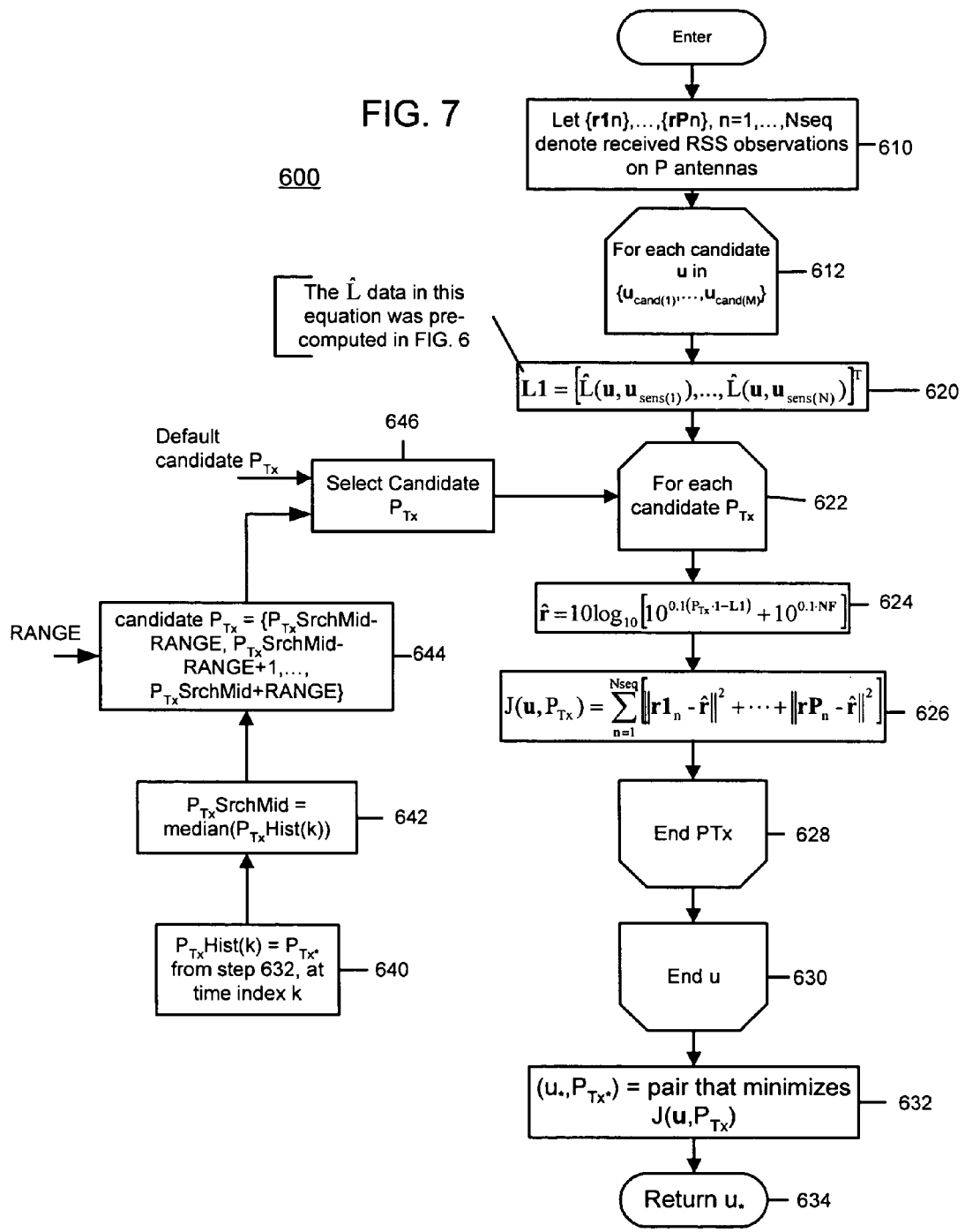
FIGS. 7 and 8 are flow charts depicting steps that may be performed to compute a position of the device using the path loss estimate data.
Figure 8:
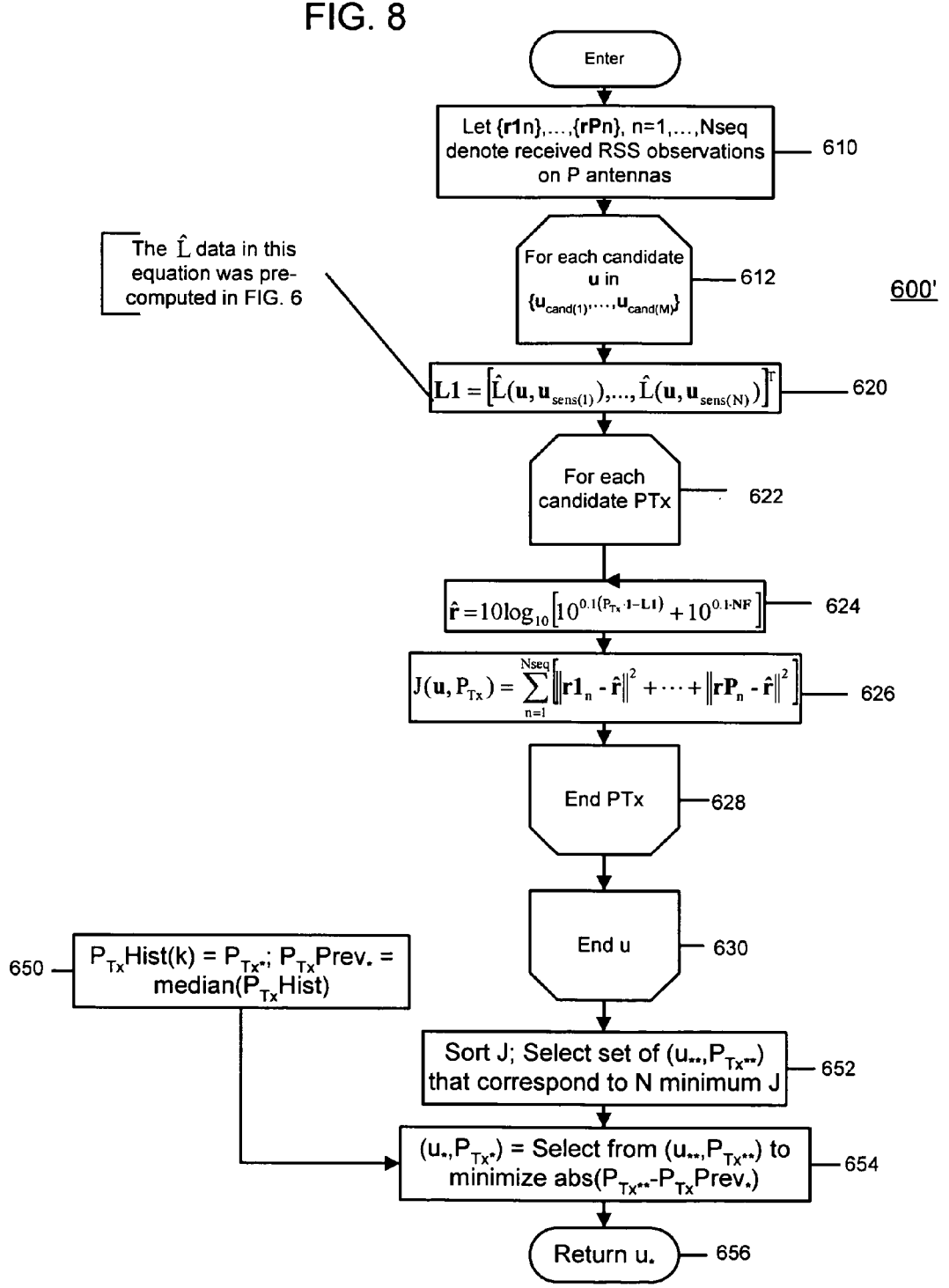

FIGS. 7 and 8 are flow charts for a position estimation phase 600, referred to as an "on-line" phase, where the path loss estimate computed in the self-calibration phase is used to estimate the position of a target device based on received signal strength observations at each of the sensors from a transmission or emission by the target device. FIGS. 7 and 8 are very similar to each other, but show different techniques for resolving position ambiguity using transmit power history information.

In step 610 of FIG. 7, a set of observation vectors {r1n}, . . . , {rPn}, n=1 to Nseq of observations (received signal events), denoting RSS observations on P (one or more) antenna(s), are received as input to the position estimation process. As indicated by step 612, a series of computations are made for each candidate position u in the candidate position set $\{u_{cand(1)}, \ldots, u_{cand(M)}\}$. In step 620, a path loss estimate matrix L1 is assembled from the path loss estimates, whereby L1=$[\hat{L}(u,u_{sens(1)}), \ldots, \hat{L}(u,u_{sens(N)})]^T$; that is L1 is the path loss estimate matrix representing the path loss estimates at candidate position u with respect to each sensor position.

Then, as shown by step 622, for each candidate transmit power $P_{Tx}$ of the device to be located, several further computations are made. The derivation of the candidate transmit powers will be described hereinafter. In step 624, the intermediate vector $\hat{r}=10\log_{10}[10^{0.1(P_{Tx} \cdot 1 - L1)} + 10^{0.1 \cdot NF}]$ is computed from the path loss estimate matrix L1. Next, in step 626, the function $J(u, P_{Tx})$ is computed as shown. As shown by step 630, steps 620-626 are performed for each candidate position u in the candidate position set $\{u_{cand(1)}, \ldots, u_{cand(M)}\}$. In step 632, the position/transmit power pair $(u^*, P_{Tx}^*)$ is the pair that minimizes the function $J(u, P_{Tx})$, where $u^*$ is the estimated position of the target device, which is returned in step 634.

Steps 640-646 illustrate one procedure for selecting the candidate transmit powers $P_{Tx}$ of the target device used in the computations shown in FIG. 7. In step 640, a history of candidate transmit powers, $P_{Tx}$Hist(k) for a target device is accumulated each time (represented by time index k) a position u* is computed for that target device in step 632. Next, in step 642, transmit power search median $P_{Tx}$SrchMid is computed for all k's. Then, using a programmable RANGE value that specifies a range or window for candidate transmit powers around the search median $P_{Tx}$SrchMid, in step 644, candidate transmit powers $P_{Tx}$ are derived as $\{P_{Tx}$SrchMid-RANGE, $P_{Tx}$SrchMid-RANGE+1, . . . , $P_{Tx}$SrchMid+RANGE$\}$. These candidate transmit powers are then used for the computations in steps 624 and 626. The set of candidate transmit powers is updated each time a new position of that target device is computed, in step 632, and ultimately, after several position computations, the set of candidate transmit powers will converge. In step 646, either a default candidate transmit power $P_{Tx}$ or the set of candidate transmit powers (from step 644) is selected. For example, in step 646, the default candidate transmit power $P_{Tx}$ may be selected if the time index k is less than a certain number; otherwise, the set of candidate transmit powers $P_{Tx}$ computed in step 644 are used. This is useful to establish an initial or default candidate transmit power before any transmit power history has been built up for the particular target device whose position is being computed.

FIG. 8 illustrates estimation process 600' similar to process 600, except that a slightly different technique is used to derive the best candidate position/transmit power pair. Steps 610 through 630 are the same as the like numbered steps in FIG. 7. In step 650, candidate transmit power history $P_{Tx}$Hist (k) is accumulated in the same manner as described above in connection with FIG. 7. $P_{Tx}$Prev* is computed as the median of the transmit power history $P_{Tx}$Hist(k), over time index k. In step 652, the values of the J function (step 626) are sorted, and a set of N optimum candidate position/transmit power pairs denoted as $(u^{}, P_{Tx}^{})$ are selected that minimize the J function. In step 654, a best candidate position/transmit power pair $(u^*, P_{Tx}^*)$ is selected to minimize an absolute value of the difference between the candidate transmit power and a median of candidate transmit powers for the target device at prior estimated positions, $abs(P_{Tx}^{**}-P_{TxPrev}^*)$. The position u* in the best candidate position/transmit power pair $(u^*, P_{Tx}^*)$ is returned as the position estimate.

A purpose of steps 640-646 in FIG. 7 and steps 650-656 in FIG. 8 is as follows. Due to the unknown transmit power of the target device, the position estimation algorithm searches a set of candidate transmit powers and selects the transmit power that optimizes the selection criterion (e.g., mean square error). This can sometimes cause ambiguity in the estimated target location. The noted portions of the algorithm search for the transmit power that optimizes the mean square error between the computed signal strength and estimated signal strength. In addition, the solution achieved by the noted steps maintains a state of the optimum estimated transmit power as the target device moves about the search area. When estimating the position of the target device at a position that has an ambiguity point, the ambiguity point can be eliminated by using knowledge about the transmit power of the target device at prior position estimates.

Figure 9:
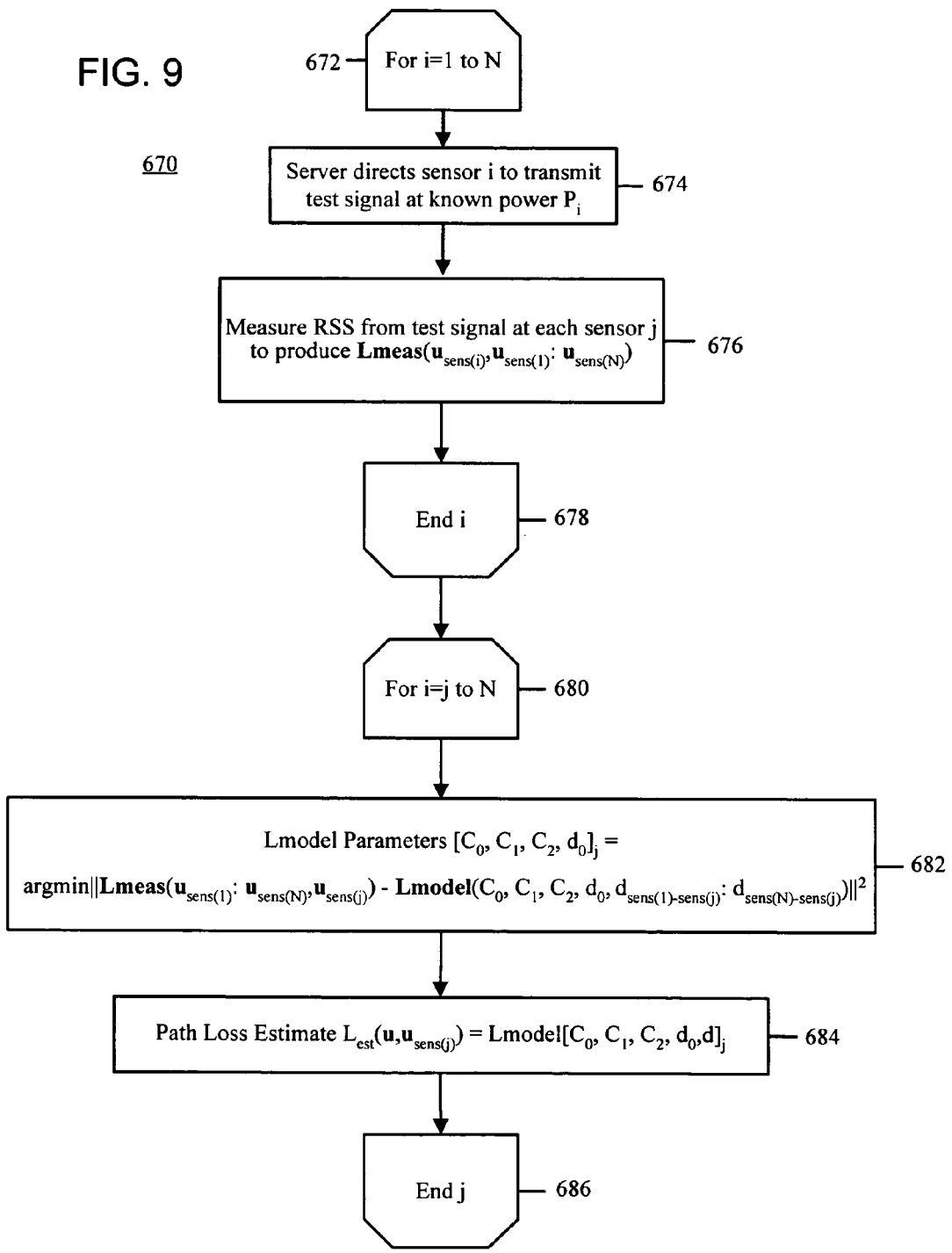
FIG. 9 is a flow chart illustrating another technique for estimating path loss between an arbitrary position and a sensor.

Another path loss estimate technique involves estimating the path loss between a point in space u and a sensor by fitting a path loss model to the conditions of the channel environment in which the sensors are deployed. FIG. 9 illustrates this alternative path loss estimation process 670, whereby the parameters for a path loss model, Lmodel, are computed based on RSS measurements taken with respect to each sensor in the deployment environment. Several path loss model examples are described above, each of which has one or more variable parameters, such as $C_0$, $C_1$, $C_2$, and $d_0$ in the case of one exemplary path loss model. For explanatory purposes, a path loss model having these four parameters described above is used in FIG. 9, but this is only an example as these techniques may be employed with any other path loss model.

Steps 672 and 678 set up a loop in which the index i is associated with a transmitting sensor. In step 674, the server directs sensor i to transmit a test signal at a known power $P_i$. Each of the other sensors receives the test signal and in step 676, the RSS is measured at each sensor(j) (each of the other sensors) and the vector Lmeas($u_{sens(i)}, u_{sens(1)}$: $u_{sens(N)}$) which represents the path loss (computed by subtracting the RSS at sensors) from $P_i$) between sensor(i) and each sensors). Steps 674 and 676 are repeated for i=1 to N thereby building a vector of this type for each sensor(i).

Steps 680 and 686 define a loop in which the index(j) is associated with a sensor with respect to which a path loss estimate is to be computed from the data computed in step 676. In step 682, the path loss model parameters [$C_0$, $C_1$, $C_2$, $d_0$] for sensors) is estimated by minimizing the mean squared error between the measured path loss and the path loss model function. That is, in step 682, the minimum of the norm squared of the difference between the vector Lmeas ($u_{sens(1)}, u_{sens(N)}$: $u_{sens(j)}$) and Lmodel($C_0$, $C_1$, $C_2$, $d_0$, $d_{sens(1)-sens(j)}$: $d_{sens(N)-sens(j)}$), is computed, where $d_{sens(1)-sens(j)}$: $d_{sens(N)-sens(j)}$ represents the distance between sensor(1) and sensors), the distance between sensor(2) and sensors), . . . , and the distance between sensor(N) and sensor(j), which are known quantities. The parameters $C_0$, $C_1$, $C_2$, $d_0$ are the variables to be computed by the argmin( ) operation for each sensors). Other arithmetic computations may be performed to solve for the parameters. In step 684, a path loss estimate $L_{est}(u, u_{sens(j)})$ is defined by evaluating the path loss model function Lmodel with the parameters $C_0$, $C_1$, $C_2$, $d_0$, for sensor(j), in other words, Lmodel$[C_0, C_1, C_2, d_0, d]_j$, where d is the distance between an arbitrary point in space (e.g., a candidate position) and the position of sensor j, $u_{sens(j)}$. Thus, each sensors) will have its own possibly unique set of path loss model parameters $C_0$, $C_1$, $C_2$, $d_0$.

The process 670 may be performed with any one or more path loss models for each sensor. It is another way of interpolating the path loss error between the measured path loss between the sensors and a path loss model for the corresponding distance. Furthermore, the process 670 may be performed after initial installation of the sensors at a particular site, or on an occasional basis thereafter to update the path loss model parameters for any changes or variations in the environment. In use, the path loss estimate $L_{est}(u, u_{sens(j)})$ is substituted in all respects in the position estimation processes of FIGS. 7 and 8 for the path loss estimate $\hat{L}(u, u_{sens(j)})$. Moreover, the process 670 may be performed in addition to the path loss estimation process of FIGS. 5 and 6, an average of the two path loss estimates is used for position estimation, or both path loss estimates are used to compute two position estimates.

To summarize the process depicted by FIG. 9, a method is provided for generating path loss estimate data associated with an area in which a plurality of radio sensor devices are deployed at known positions and used to determine a position of a target device in the area based on emissions received from the target device comprising: with respect to a test signal transmitted by each radio sensor device at a known position, measuring path loss at each of the other radio sensor devices to measure the path loss between all combinations of pairs of radio sensor devices; for each radio sensor device, deriving parameters for a path loss model function from the measured path loss between that radio sensor device and each of the other radio sensor devices; and computing a path loss estimate between a position and each radio sensor device by evaluating the path loss model function using the parameters derived for each radio sensor device. Said another way, the method comprises: with respect to a test signal transmitted from each known position, measuring path loss at each of the other known positions to measure the path loss between all combinations of pairs of known positions; for each known position, deriving parameters for a path loss model function from the measured path loss between that known position and each of the other known positions; and computing a path loss estimate between a candidate position and each known position by evaluating the path loss model function using the parameters derived for each known position.

Deriving the parameters may involve minimizing the mean squared error between the measured path loss and the path loss model function, that is, computing a minimum of a square of a norm of a difference between a vector representing measured path loss between a known position and each of the other known positions and a vector representing the path loss model function based on corresponding distances between the known position and each of the other known positions.

FIGS. 5-8 show examples of how to implement an algorithm that achieves the position estimator described above under "Theory of Operation". There are other ways to implement the position estimation algorithm without departing from the scope and spirit of the concepts described herein.

The processes described above in conjunction with FIGS. 2-9 may be extended to 3-dimensions in space. In that case, the measured data is between two 3-dimensional points ($u_1$ and $u_2$) in space, rather two 2-dimensional points. In addition, the path loss function model is evaluated with respect to the distance between 2 points in 3-dimensions, and ultimately the estimated path loss for a sensor is between a point in 3-dimensions and a sensor position, such that the resulting estimated path loss data is represented by a volume, rather than a surface (as shown in FIGS. 2-4).

The multiple observation and multiple-antenna sensor enhancements described above are useful in conjunction with the estimated path loss data produced according to the methodology of FIGS. 2-9, or with RSS calibration data obtained through any other means using techniques known in the art.

An advantage of the techniques for generating path loss estimates as described above (in conjunction with FIGS. 2-9) is that they reduce the costs, and/or relieve the user (or system installer) of the more laborious tasks associated with known calibration techniques (e.g., numerous sensors or transmit-only devices at known positions, walking a transmitter through an area, imported coverage maps, etc.). Both the interpolated error path loss estimation technique (FIGS. 5 and 6) and the path loss model parameter derivation technique (FIG. 9) use real path loss data representing the environment and conditions where position estimations are to be computed because it is performed after the sensors are installed for use at a site, and periodically or on occasion thereafter to update the path loss estimate according to changes conditions at the site. However, these techniques are not limited to self-calibration among the sensors. They may also be used to improve the performance of the known calibration techniques. For example, these techniques can be used to reduce the required number of calibration points, sensor devices and/or transmit-only devices to achieve a desired level of position accuracy.

Additional Features and Concepts

Figure 10:
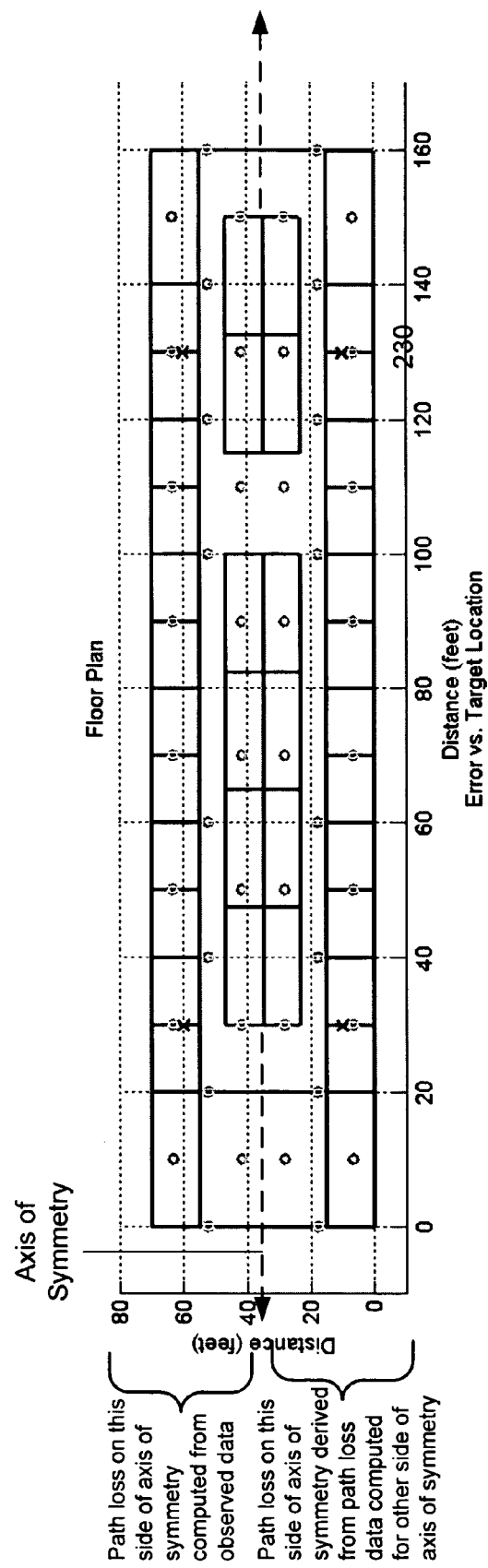
FIG. 10 is a diagram illustrating deployment of sensors on a floor plan that exhibits symmetry.

FIG. 10 illustrates how symmetry with respect to sensors deployed in an area can be exploited to simplify derivation of the path loss data. As shown there is an axis in the area with respect to possible sensor positions shown by the small circles, and planned sensor positions shown by the "x's". The symmetry can be exploited. Path loss data may be computed, as described above in connection with FIGS. 2-6 or FIG. 9, on one side of the axis of symmetry and then from that data, the path loss data for the other side of the axis of symmetry is derived. As a result of recognizing the benefits of the symmetry, sensors may need to be deployed only on one side of the axis of symmetry, thereby saving cost of the system deployment without sacrificing capability or accuracy.

Figure 11:
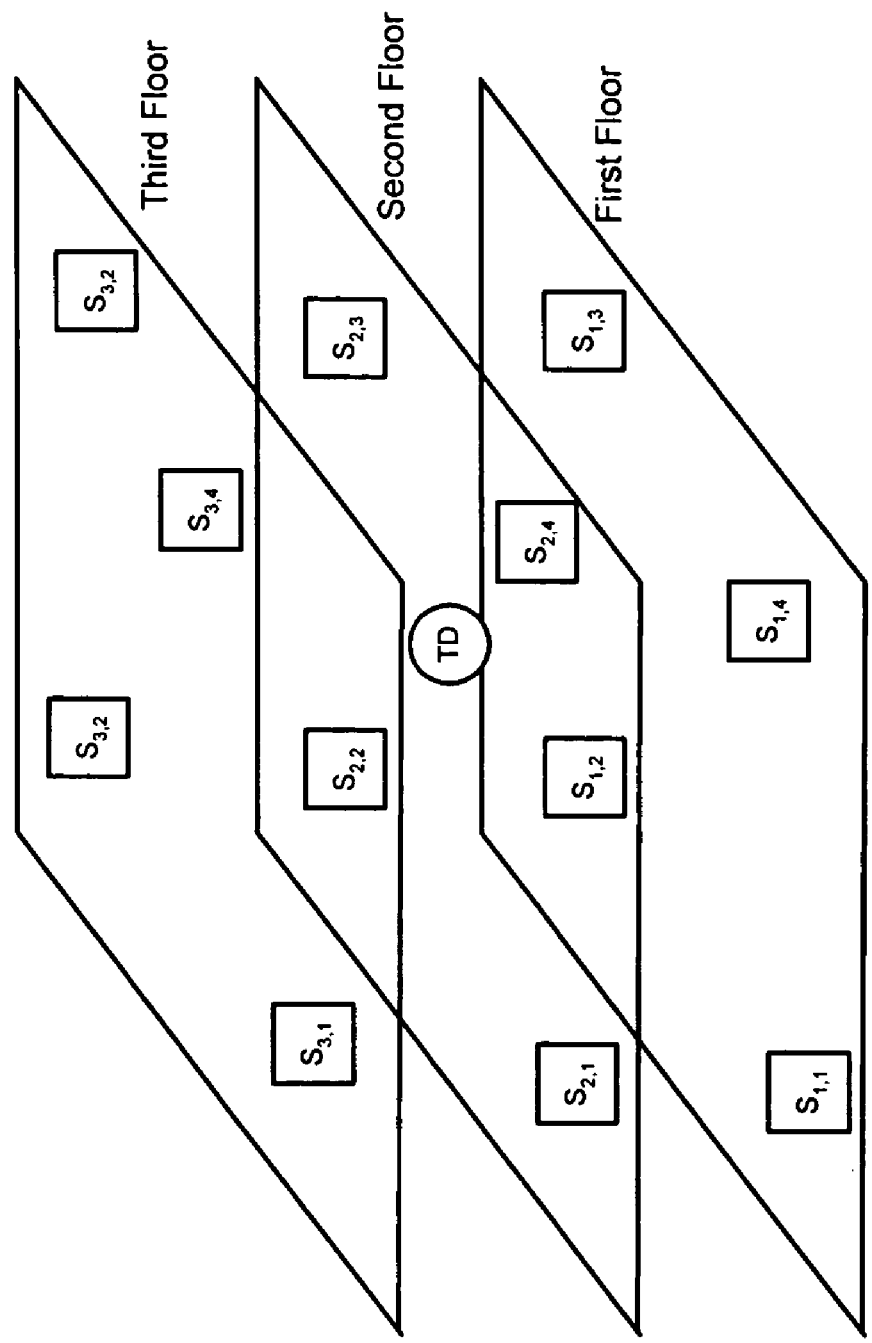
FIG. 11 is a diagram depicting configurations for location devices in a multi-story building.

With reference to FIG. 11, multiple sensors may be deployed on each floor of a multi-story (e.g., 3-story) building. For example, sensors $S_{1,1}$, $S_{1,2}$, $S_{1,3}$, and $S_{1,4}$ are on the first floor, sensors $S_{2,1}$, $S_{2,2}$, $S_{2,3}$, and $S_{2,4}$ are on the second floor and sensors $S_{3,1}$, $S_{3,2}$, $S_{3,3}$, and $S_{3,4}$ are on the third floor. One multi-story approach is called an average power per sensor per floor (APSF) approach. Let P(f,k) be the power received (in mW, not dB) from the target device (TD) at the kth sensor on floor f. The server computes $P_{avg}(f) = \Sigma_k P(f,k)/N(f)$, the average power (or receive signal strength) per sensor per floor, where N(f) is the number of sensors on floor f. The server predicts that the TD is on floor $f_0$, where $f_0$ maximizes $P_{avg}(f)$ over f.

Another multi-story location approach is to put sensors on multiple floors and use these sensors to locate the target device in three dimensions where the sensor locations are tracked in 3-dimensions (instead of 2-dimensions) and 3-dimensional data is used (in the processes shown in FIGS. 2-8). The benefits of this approach relative to the APSF approach is that it depends less on building layout and sensor calibration.

A hybrid approach may be provided that combines these two approaches, where sensors from a certain number of floors (e.g., 3) having the highest Pavg(f) are used to triangulate on the target in three-dimensions using the processes shown in FIGS. 2-8.

Figure 12:
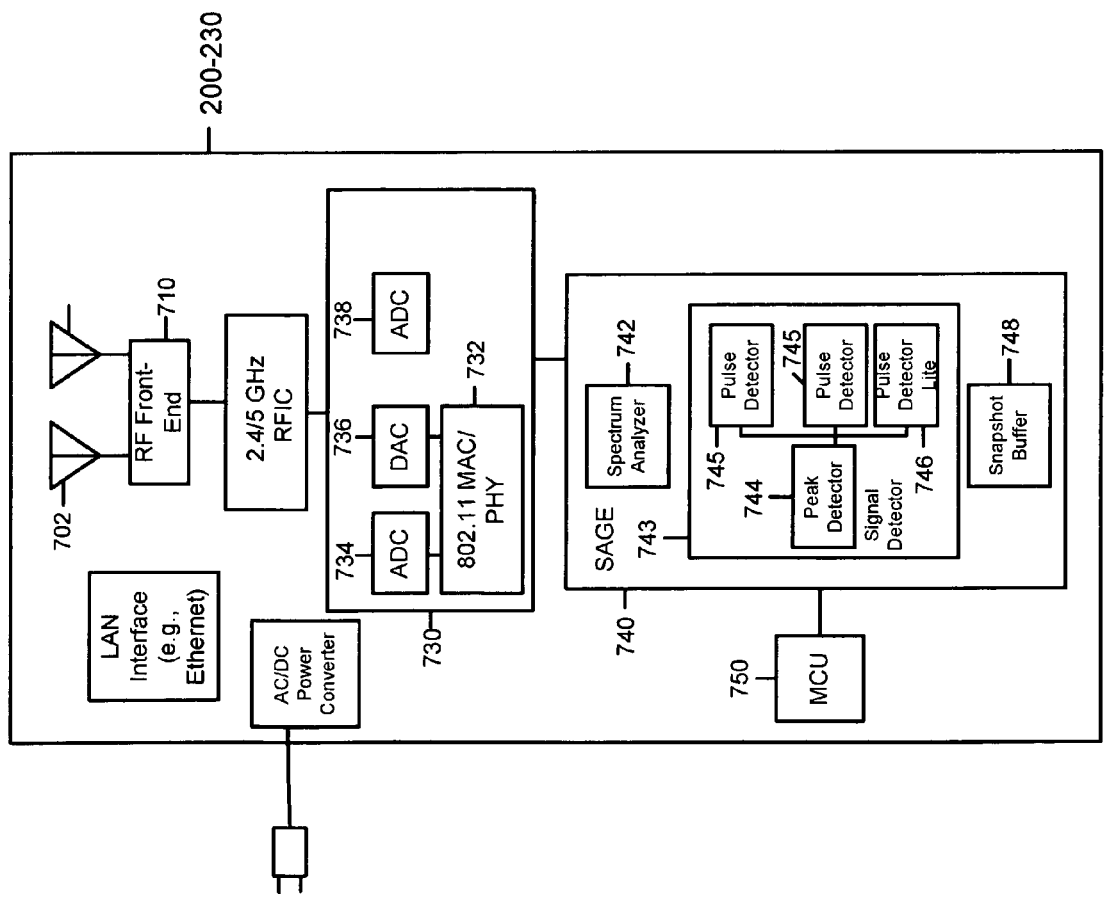
FIG. 12 is a block diagram of a sensor device useful in connection with the location process.

FIG. 12 illustrates an example of a block diagram for the sensors 200-230 shown in FIG. 1. The sensor comprises one or more antennas 702 and 704 (two are shown for an example) connected to an RF front-end 710 which in turn is connected to an RF integrated circuit (RFIC) 720. The RFIC 720 performs the downconverting associated with received signals and upconverting associated with signals to be transmitted. The RFIC 720 may operate in more than one band, such as in the 2.4 GHz and the 5 GHz unlicensed bands. A baseband IC (BBIC) 730 is connected to the RFIC 720 and performs the baseband signal processing associated with sensor functions. The BBIC 730 comprises an 802.11 media access control (MAC)/physical layer (PHY) or modem 732 block that performs the necessary baseband modulation and demodulation and MAC control functions associated with, for example, one or more of the IEEE 802.11 WLAN communication standards. An analog-to-digital converter (ADC) 734 and a digital-to-analog converter (DAC) 736 connect between the block 732 and the RFIC 720. A microprocessor control unit (MCU) 750 connects to (or is integrated in) the BBIC 730 and connects to the MAC/PHY block 732. A real-time spectrum analysis engine (SAGE) block 740 may also be provided as part of (or separate from) the BBIC and is interfaced with the RFIC 720 via the ADC 738.

The SAGE block 740 includes a spectrum analyzer 742, a signal detector 743 consisting of a peak detector 744 and one or more pulse detectors 745, a pulse detector lite block 746, and a snapshot buffer 748. A Fast Fourier Transform (FFT) block (not shown) is coupled to the spectrum analyzer 742, or included in the spectrum analyzer 2132. The SAGE 740 generates spectrum activity information that is used in the sensor and the server to determine (classify/identify) the types of signals occurring in the frequency band, and captures signals for location measurement operations. The functions of the SAGE 740 are described more fully in commonly assigned U.S. Pat. No. 6,714,605, commonly assigned co-pending U.S. application Ser. No. 10/420,511, filed Apr. 22, 2003, entitled "System and Method for Real-Time Spectrum Analysis in a Radio Device," and commonly assigned co-pending U.S. Provisional Patent Application No. 60/587,834, filed Jul. 14, 2004, entitled "Pulse Detection Scheme for Use in Real-Time Spectrum Analysis."

The snapshot buffer 748 collects a set of raw digital signal samples useful for signal classification and deriving RSS data from received packets. The snapshot buffer 748 can be triggered to begin sample collection from either the signal detector 748 or from an external trigger source, such as a signal from the processor to capture received signal data for a period of time sufficient to include a series of signal exchanges used for location estimation. Alternatively, the snapshot buffer may be in a free-running state continuously storing captured and then in response to detecting the first signal (e.g., the Probe Request frame), the snapshot buffer is put into a post-store mode that extends long enough to capture the ACK frame signal data. Furthermore, the snapshot buffer 748 can capture raw (digital) data for a received signal from any type of target device, even a device that may interfere with a particular type of communication network, such as an 802.11 WLAN. Among other functions, The MCU 750 can then perform processing on the captured raw data to compute a RSS measurement data therefrom. Moreover, using the snapshot buffer 748 data to compute the RSS data achieves greater accuracy and range than is possible with an 802.11 chipset device, for example.

Figure 13:
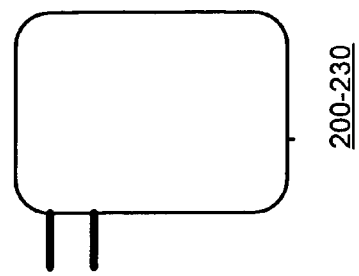
FIG. 13 is a diagram depicting one physical configuration of the sensor as a wall outlet plug-in device.

The advantage of the sensor configuration shown in FIG. 12 is that it may be manufactured into a relatively small form factor, such as an outlet plug-in unit, as shown in FIG. 13, and connection made back to the server via a wireless 802.11 WLAN link as described above. Thus, installing and deploying sensors of this type is simple.

In summary, a method is provided for determining a position of a target device based on data pertaining to strength of an emission received from the target device at a plurality of known positions, the method comprising: receiving an emission from the target device at each of a plurality of known positions to produce receive signal strength data; and computing a most likely position over a plurality of candidate positions and a plurality of candidate transmit powers of the target device based on the receive signal strength data. The most likely position may be computed over a plurality of candidate positions, a plurality of candidate transmit powers and a plurality of path loss models. The various path loss estimation and position estimation techniques described herein may be used in conjunction with this method.

According to one embodiment, a method is provided for generating path loss estimate data associated with an area in which a plurality of radio sensor devices are deployed at known positions and used to determine a position of a target device in the area based on emissions received from the target device, the method comprising: with respect to a test signal transmitted by each radio sensor device, measuring path loss at each of the other radio sensor devices to measure the path loss between all combinations of pairs of radio sensor devices; evaluating a path loss model based on the distance between all combinations of pairs of radio sensor devices to produce path loss model data; computing, relative to each radio sensor device, a path loss error between the measured path loss and the path loss model data when the path loss is measured at each of the other radio sensor positions relative to that radio sensor device; interpolating a path loss error relative to each radio sensor device at a candidate position from the corresponding computed path loss errors; and computing a path loss estimate between a candidate position and each radio sensor device by adding the interpolated path loss error relative to a radio sensor device at the candidate position to path loss data obtained by evaluating the path loss model based on a distance between a position of the corresponding radio sensor device and the candidate position.

According to another embodiment, a method is provided for generating path loss estimate data associated with an area in which a plurality of radio sensor devices are deployed at known positions and used to determine a position of a target device in the area based on emissions received from the target device, the method comprising: with respect to a test signal transmitted by each radio sensor device, measuring path loss at each of the other radio sensor devices to measure the path loss between all combinations of pairs of radio sensor devices; for each radio sensor device, deriving parameters for a path loss model function from the measured path loss between that radio sensor device and each of the other radio sensor devices; and computing a path loss estimate between a position and each radio sensor device by evaluating the path loss model function using the parameters derived for each radio sensor device.

Furthermore, a method is provided for producing path loss data with respect to signals transmitted between each of a plurality of radio sensor devices deployed at a corresponding position in an area where a position of a target device is to be computed, the method comprising: identifying an axis of symmetry with respect to the positions of the plurality of sensors; with respect to signals transmitted by each of the plurality of radio sensor devices, computing first path loss data with respect to the plurality of sensors at positions on one side of the axis of symmetry; and deriving the path loss data with respect to the plurality of sensors at positions on an opposite side of the axis of symmetry from the first path loss data.

Still further, a method is provided for determining the position of a target device that emits radio signals in a multi-story building, comprising: deploying a plurality of radio sensor devices at known positions on each of the floors of a multi-storing building; receiving radio emissions from the target device at the plurality of radio sensor devices and deriving received power data at each radio sensor device from the received radio emissions, where P(f,k) is the power received from the target device at the kth sensor on floor f; computing an average power per sensor per floor Pavg(f)=ΣkP(f,k)/N(f), wherein N(f) is the number of sensors on floor f; and estimating that the target device is on floor f0, where f0 maximizes Pavg(f) over f.

All of the path loss estimation and position estimation techniques described herein may be embodied by a computer readable medium storing instructions that, when executed by a computer or processor, cause the computer or processor to perform the various path loss estimation and position estimation computation techniques described herein.

The above description is intended by way of example only.

What is claimed is:

1. A system for determining a position of a target device that makes radio emissions, the system comprising:
   a. a plurality of radio sensor devices at known positions within in an area, each radio sensor device capable of receiving radio emissions;
   b. a computing device coupled to the plurality of radio sensor devices and receiving data therefrom that represents strength of signals received by the radio sensor devices from the target device, wherein the computing device estimates a location of the target device by processing receive signal strength data obtained by the plurality of radio sensor devices with respect to path loss estimate data, and wherein the computing device computes the path loss estimated data by:
      i. with respect to a test signal transmitted by each radio sensor device, measuring path loss at each of the other radio sensor devices to obtain the path loss between all combinations of pairs of radio sensor devices;
      ii. evaluating a path loss model based on the distance between all combinations of pairs of radio sensor devices to produce path loss model data;
      iii. computing, relative to each radio sensor device, a path loss error between the measured path loss and the path loss model data when the path loss is measured at each of the other radio sensor positions relative to that radio sensor device;
      iv. interpolating a path loss error relative to each radio sensor device at a candidate position from the path loss errors using a multi-dimensional interpolation technique; and
      v. computing a path loss estimate between a candidate position and each radio sensor device by adding the interpolated path loss error relative to a radio sensor device at the candidate position to path loss data obtained by evaluating the path loss model based on a distance between a position of the corresponding radio sensor device and the candidate position.

2. The system of claim 1, wherein the computing device interpolates path loss error relative to each radio sensor device at each of a plurality of candidate positions, and computes a path loss estimate between each of the plurality of candidate positions and each radio sensor device by adding the interpolated path loss error relative to a radio sensor device at each candidate position to path loss data obtained by evaluating the path loss model based on a distance between the position of the corresponding radio sensor device and the corresponding candidate position.

3. The system of claim 1, wherein the computing device estimates the position u* of the target device by computing the position $$u_* = \arg\min_{u}\min_{P_{Tx}} \|r - \hat{r}(u, P_{Tx})\|^2,$$

where u is one of the plurality of candidate positions, $PT_{Tx}$ is one of a plurality of candidate transmit powers of the target device, r is a vector representing receive signal strength observations at the plurality of radio sensor devices from one or more signals transmitted by the target device, and $$\hat{r}(u, P_{Tx}) \triangleq 10\log_{10}\left[10^{0.1\left(P_{Tx}\cdot 1 - [\hat{L}(u,u_{sens(1)}),\ldots,\hat{L}(u,u_{sens(N)})]^T\right)} + 10^{0.1\cdot NF}\right],$$

$$\hat{L}(u, u_{sens(j)}) \triangleq Lmodel(u, u_{sens(j)}) + Interp(u, u_{sens(1)}, \cdots, u_{sens(N)}, e_j)$$

is the path loss estimate at candidate position u with respect to sensor position (j), $u_{sens(j)}$, and Lmodel(u, $u_{sens(j)}$) is path loss model data between candidate position u and sensor position $u_{sens(j)}$, $e_j$ is the path loss error between the measured path loss and the path loss model data Lmodel(u, $u_{sens(j)}$), and Interp( ) is an interpolation function representing the interpolated path loss error relative to each radio sensor device at a candidate position from the path loss errors.

4. The system of claim 3, wherein the computing device estimates the position of the target device based on a sequence $r_1, \ldots, r_{Nseq}$ of receive signal strength observations from multiple transmissions by the target device, by computing the position $$u_* = \arg\min_{u}\min_{P_{Tx}} \sum_{n=1}^{N_{seq}} \|r_n - \hat{r}(u, P_{Tx})\|^2,$$

for the Nseq of observations $r_1, \ldots, r_{Nseq}$.

5. The system of claim 3, wherein the computing device estimates the position of the target device based on a sequence $r_n$ of receive signal strength observations from multiple transmissions by the target device, by solving for $$u_* = \arg\min_u \min_{P_{Tx}} LPF(\|r_n - \hat{r}(u, P_{Tx})\|^2),$$

where LPF represents a low pass filter, one for each candidate position/transmit power pair $(u,P_{Tx})$, and wherein a most likely position estimate is the candidate position that corresponds to the low pass filter having the smallest output.

6. The system of claim 3, wherein the computing device estimates the position of the target device based on a sequence of $\{r1_n\}, \ldots, \{rP_n\}$ of receive signal strength observation sequences at P antennas of each radio sensor device.

7. The system of claim 3, wherein the computing device estimates the position u* of the target device by computing $$u_* = \arg\min_u \min_{P_{Tx}} \sum_{n=1}^{N_{seq}} [\|r1_n - \hat{r}(u, P_{Tx})\|^2 + \cdots + \|rP_n - \hat{r}(u, P_{Tx})\|^2].$$

8. The system of claim 3, wherein the computing device estimates the position u* of the target device by computing $$u_* = \arg\min_u \min_{P_{Tx}} LPF[\|r1_n - \hat{r}(u, P_{Tx})\|^2 + \cdots + \|rP_n - \hat{r}(u, P_{Tx})\|^2],$$

where LPF represents a low pass filter, one for each candidate position/transmit power pair $(u,P_{Tx})$, and wherein a most likely position estimate is the candidate position that corresponds to the low pass filter having the smallest output.

9. The system of claim 8, wherein the computing device estimates the position u* of the target device by minimizing over multiple path loss models.

10. The system of claim 9, wherein the computing device estimates the position u* of the target device by computing $$u_* = \arg\min_u \min_{model} \min_{P_{tx}} LPF(\|r1_n - \hat{r}(u, P_{Tx})\|^2 + \cdots + \|rP_n - \hat{r}(u, P_{Tx})\|^2),$$

where a first path loss model is associated with relatively low obstruction densities and a second path loss model is associated with relatively high obstruction densities.

11. The system of claim 8, wherein the computing device estimates the position u* of the target device by computing a first position estimate using a first low pass filter and a second position estimate using a second low pass filter, wherein the first low pass filter has a slower response than the second low pass filter and wherein the computing device selects the first position estimate as the position estimate u* of the target device unless a difference between the first position estimate and the second position estimate is greater than a threshold, in which case the computing device selects the second position estimate as the position estimate u* of the target device.

12. The system of claim 3, wherein the computing device estimates the position of the target device by selecting the candidate position u that is closest in Euclidean distance to the receive signal strength observations r with respect to the path loss estimate for each radio sensor device, $\hat{L}(u, u_{sens(j)})$.

13. The system of claim 3, wherein the computing device estimates a position of the target device by, for each candidate position and for a range of candidate transmit powers $PT_{Tx}$ of the target device:

a. computing $\hat{r} = 10 \log_{10}[10^{0.1(P_{Tx} \cdot 1 - L1)} + 10^{0.1 \cdot NF}]$, where $L1 = [\hat{L}(u,u_{sens(1)}), \ldots, \hat{L}(u,u_{sens(N)})]^T$ is a matrix composed of path loss estimates $\hat{L}(u,u_{sens(1)})$ to $\hat{L}(u,u_{sens(N)})$ at candidate position u with respect to each radio sensor device position and NF is the noise floor at each radio sensor device;

b. computing a function $$J(u, P_{Tx}) = \sum_{n=1}^{N_{seq}} [\|r1_n - \hat{r}\|^2 + \cdots + \|rP_n - \hat{r}\|^2]$$

for each candidate position u and candidate transmit power $P_{Tx}$, where $\{r1n\}, \ldots, \{rPn\}$, n=1, ..., Nseq, are receive signal strength observations on P antennas of each of the plurality of radio sensor devices; and c. selecting the candidate position that minimizes the function $J(u,P_{Tx})$ over all candidate positions and transmit powers.

14. The system of claim 13, wherein the computing device selects the candidate position in the candidate position/transmit power pair that minimizes the function $J(u,P_{Tx})$.

15. The system of claim 14, wherein the computing device generates one or more candidate transmit powers based on prior estimated positions of the target device.

16. The system of claim 15, wherein the computing device generates one or more candidate transmit powers by storing candidate transmit powers for prior estimated positions of the target device, computing a median candidate transmit power from the stored candidate transmit powers for prior estimated positions, and providing a set of candidate transmit powers based on the median.

17. The system of claim 16, wherein the computing device provides a set of candidate transmit powers by providing a plurality of transmit powers that progressively deviate from the median by a desired amount.

18. The system of claim 3, wherein the computing device estimates a position of the target device by, for each candidate position and for a range of candidate transmit powers $PT_x$ of the target device:

a. computing $\hat{r} = 10 \log_{10}[10^{0.1(P_{Tx} \cdot 1 - L1)} + 10^{0.1 \cdot NF}]$, where $L1 = [\hat{L}(u,u_{sens(1)}), \ldots, \hat{L}(u,u_{sens(N)})]^T$ is a matrix composed of path loss estimates $\hat{L}(u,u_{sens(1)})$ to $\hat{L}(u,u_{sens(N)})$ at candidate position u with respect to each sensor position and NF is the noise floor at each sensor;

b. computing a function $$J(u, P_{Tx}) = \sum_{n=1}^{N_{seq}} [\|r1_n - \hat{r}\|^2 + \cdots + \|rP_n - \hat{r}\|^2]$$

for each candidate position u and candidate transmit power $P_{Tx}$, where $\{r1n\}, \ldots, \{rPn\}, \ldots, \{rPn\}$, n=1, ..., Nseq, are receive signal strength observations on P antennas of each of the plurality of radio sensor devices;

c. selecting a set of candidate position/candidate transmit power pairs that are the N minimum of the function $J(u, P_{Tx})$; and d. selecting the candidate position/transmit power pair in the set of candidate position/candidate transmit power pairs that minimizes an absolute value of the difference between the candidate transmit power and a median of candidate transmit powers for the target device at prior estimated positions, wherein the candidate position in the selected candidate position/candidate transmit power pair is the position estimate of the target device.

19. The system of claim 18, wherein the computing device stores candidate transmit powers for prior estimated positions of the target device and computes the median candidate transmit power from the stored candidate transmit powers for prior estimated positions of the target device.

20. The system of claim 3, wherein the computing device estimates the position u* of the target device by further minimizing over multiple path loss models.

21. The system of claim 3, wherein the computing device applies an iterative multi-dimensional minimization algorithm to the equation $$\arg\min_{u} \min_{P_{Tx}} \|r - \hat{r}(u, P_{Tx})\|^2 \text{ over } u.$$

22. The system of claim 1, wherein the computing device computes the path loss estimate in three-dimensions.

23. The system of claim 1, wherein each of the plurality of radio sensor devices comprises a buffer memory that stores raw analog-to-digital converter samples of emissions received from the target device, and wherein the receive signal strength data is derived from the samples.

24. The system of claim 1, wherein the plurality of sensors are deployed on each floor of a multiple floor building, and wherein the computing device selects a subset of the plurality of sensors on a certain number of floors of the building used for computing the estimate of the position of the target device.

25. The system of claim 24, wherein the computing device computes an average power per sensor per floor $P_{avg}(f) = \Sigma_k P(f,k)/N(f)$, wherein $N(f)$ is the number of sensors on floor f and $P(f,k)$ is the power received from the target device at the kth sensor on floor f, and the computing device selects the subset of sensors as those sensors on those floors f having the relatively higher $P_{avg}(f)$.

26. A method for generating path loss estimate data associated with an area in which a plurality of radio sensor devices are deployed at known positions and used to determine a position of a target device in the area based on emissions received from the target device, the method comprising:

a. with respect to a test signal transmitted by each radio sensor device, measuring path loss at each of the other radio sensor devices to measure the path loss between all combinations of pairs of radio sensor devices;

b. evaluating a path loss model based on the distance between all combinations of pairs of radio sensor devices to produce path loss model data;

c. computing, relative to each radio sensor device, a path loss error between the measured path loss and the path loss model data when the path loss is measured at each of the other radio sensor positions relative to that radio sensor device;

d. interpolating a path loss error relative to each radio sensor device at a candidate position from the corresponding computed path loss errors using a multi-dimensional interpolation technique; and e. computing a path loss estimate between a candidate position and each radio sensor device by adding the interpolated path loss error relative to a radio sensor device at the candidate position to path loss data obtained by evaluating the path loss model based on a distance between a position of the corresponding radio sensor device and the candidate position.

27. The method of claim 26, wherein interpolating comprises interpolating the path loss error relative to each radio sensor device at each of a plurality of candidate positions, and the step of computing the path loss estimate comprises computing a path loss estimate between each of the plurality of candidate positions and each radio sensor device by adding the interpolated path loss error relative to a radio sensor device at each candidate position to path loss data obtained by evaluating the path loss model based on a distance between the position of the corresponding radio sensor device and the corresponding candidate position.

28. A method for determining a position of a target device based on data pertaining to strength of an emission received from the target device at a plurality of known positions, the method comprising:

a. receiving an emission from the target device at each of a plurality of known positions to produce receive signal strength data; and b. computing a most likely position over a plurality of candidate positions, a plurality of path loss models and a plurality of candidate transmit powers of the target device based on the receive signal strength data, wherein computing comprises computing the most likely position by minimizing over the plurality of path loss models.

29. The method of claim 28, wherein computing comprises processing received signal strength data obtained at each of the plurality of known positions with respect to estimated path loss data with respect to each known position.

30. The method of claim 29, and further comprising generating path loss estimate data with respect to each known position by:

i. with respect to a test signal transmitted by from each known position, measuring path loss at each of the other known positions to measure the path loss between all combinations of pairs of known positions;

ii. evaluating a path loss model based on the distance between all combinations of pairs of known positions to produce path loss model data;

iii. computing, relative to each known position, a path loss error between the measured path loss and the path loss model data when the path loss is measured at each of the other known positions relative to that known position;

iv. interpolating a path loss error relative to each known position at a candidate position from the corresponding computed path loss errors; and v. computing a path loss estimate between a candidate position and each known position by adding the interpolated path loss error relative to a known position at the candidate position to path loss data obtained by evaluating the path loss model based on a distance between a known position and the candidate position.

31. The method of claim 30, wherein interpolating comprises interpolating the path loss error relative to each known position at each of a plurality of candidate positions, and computing the path loss estimate comprises computing a path loss estimate between each of the plurality of candidate positions and each known position by adding the interpolated path loss error relative to a known position at each candidate position to path loss data obtained by evaluating the path loss model based on a distance between the known position and the corresponding candidate position.

32. The method of claim 31, wherein interpolating the path loss error comprises interpolating the path loss error relative to each known position at each candidate position using a multi-dimensional interpolation technique.

33. The method of claim 29, and further comprising generating estimated path loss data with respect to each known position by:
  a. with respect to a test signal transmitted from each known position, measuring path loss at each of the other known positions to measure the path loss between all combinations of pairs of known positions;
  b. for each known position, deriving parameters for a path loss model function from the measured path loss between that known position and each of the other known positions; and
  c. computing a path loss estimate between a candidate position and each known position by evaluating the path loss model function using the parameters derived for each known position.

34. The method of claim 33, wherein deriving comprises minimizing a mean squared error between the measured path loss between a known position and each of the other known positions and the path loss model function between that known position and each of the other known positions.

35. The method of claim 34, wherein deriving comprises computing a minimum of a square of a norm of a difference between a vector representing measured path loss between a known position and each of the other known positions and a vector representing the path loss model function based on corresponding distances between the known position and each of the other known positions.

36. The method of claim 28, wherein receiving comprises receiving one or more emissions from the target device at each of a plurality of antennas at each of the plurality of known positions.

37. A method for determining a position of a target device based on data pertaining to strength of an emission received from the target device at a plurality of known positions, the method comprising:
  a. receiving an emission from the target device at each of a plurality of known positions to produce receive signal strength data; and
  b. computing a most likely position over a plurality of candidate positions, a plurality of path loss models and a plurality of candidate transmit powers of the target device based on the receive signal strength data, wherein computing comprises computing a position $u^*$, where $$u_* = \arg\min_u \min_{P_{Tx}} \|r - \hat{r}(u, P_{Tx})\|^2,$$

where $u$ is one of the plurality of candidate positions, $P_{Tx}$ is one of a plurality of candidate transmit powers of the target device, $r$ is a vector representing receive signal strength observations at the plurality of radio sensor devices, and $$\hat{r}(u, P_{Tx}) \triangleq 10\log_{10}\left[10^{0.1\left(P_{Tx}\cdot 1 - [\hat{L}(u,u_{sens(1)}),\ldots \hat{L}(u,u_{sens(N)})]^T\right)} + 10^{0.1\cdot NF}\right],$$

where $$\hat{L}(u, u_{sens(j)}) \triangleq Lmodel(u, u_{sens(j)}) + Interp(u, u_{sens(1)}, \ldots, u_{sens(N)}, e_j)$$

is a path loss estimate at candidate position $u$ with respect to sensor position (j), $u_{sens(j)}$, and $Lmodel(u, u_{sens(j)})$ is path loss model data between candidate position $u$ and sensor position $u_{sens(j)}$, $e_j$ is the path loss error between the measured path loss and the path loss model data $Lmodel(u, u_{sens(j)})$, and Interp( ) is an interpolation function representing interpolation of the path loss error relative to each radio sensor device at a candidate position from the path loss errors.

38. The method of claim 37, wherein computing comprising applying an iterative multi-dimensional minimization algorithm to the equation $$\arg\min_u \min_{P_{Tx}} \|r - \hat{r}(u, P_{Tx})\|^2 \text{ over } u.$$

39. The method of claim 37, wherein computing comprises estimating the position of the target device based on a sequence $r_1, \ldots, r_{Nseq}$ of receive signal strength observations from multiple transmissions by the target device, by computing the position $$u_* = \arg\min_u \min_{P_{Tx}} \sum_{n=1}^{N_{seq}} \|r_n - \hat{r}(u, P_{Tx})\|^2,$$

for the Nseq of observations $r_1, \ldots, r_{Nseq}$.

40. The method of claim 37, wherein computing comprises estimating the position of the target device based on a sequence $r_n$ of receive signal strength observations from multiple transmissions by the target device, by solving for $$u_* = \arg\min_u \min_{P_{Tx}} LPF_n(\|r_n - \hat{r}(u, P_{Tx})\|^2),$$

where LPF represents a low pass filter, one for each candidate position/transmit power pair $(u, P_{Tx})$, and wherein a most likely position estimate is the candidate position that corresponds to the low pass filter having the smallest output.

41. The method of claim 37, wherein computing a position estimate $u^*$ of the target device comprises computing $$u_* = \arg\min_u \min_{P_{Tx}} LPF_n[\|r1_n - \hat{r}(u, P_{Tx})\|^2 + \ldots + \|rP_n - \hat{r}(u, P_{Tx})\|^2],$$

where LPF represents a low pass filter, one for each candidate position/transmit power pair $(u, P_{Tx})$, and wherein a most likely position estimate is the candidate position that corresponds to the low pass filter having the smallest output.

42. The method of claim 41, wherein computing position estimate $u^*$ of the target device comprises computing a first position estimate using a first low pass filter and a second position estimate using a second low pass filter, wherein the first low pass filter has a slower response than the second low pass filter and further comprising selecting the first position estimate as the position estimate u* of the target device unless a difference between the first position estimate and the second position estimate is greater than a threshold, otherwise selecting the second position estimate as the position estimate u* of the target device.

43. The method of claim 37, wherein computing a position estimate u* of the target device comprises computing $$u_* = \arg\min_u \min_{model} \min_{P_{Tx}} LPF(\|r1_n - \hat{r}(u, P_{Tx})\|^2 + \ldots + \|rP_n - \hat{r}(u, P_{Tx})\|^2),$$

where a first path loss model is associated with relatively low obstruction densities and a second path loss model is associated with relatively high obstruction densities.

44. A method for determining a position of a target device based on data pertaining to strength of an emission received from the target device at a plurality of known positions, the method comprising:
  a. receiving an emission from the target device at each of a plurality of known positions to produce receive signal strength data; and
  b. computing a most likely position over a plurality of candidate positions, a plurality of path loss models and a plurality of candidate transmit powers of the target device based on the receive signal strength data, wherein computing comprises computing a position estimate of the target device by, for each candidate position and for a range of candidate transmit powers $PT_x$ of the target device: computing $\hat{r} = 10 \log_{10}[10^{0.1(P_{Tx} \cdot 1 - L1)} + 10^{0.1 \cdot NF}]$, where
  $L1 = [\hat{L}(u, u_{sens(1)}), \ldots, \hat{L}(u, u_{sens(N)})]^T$ is a matrix composed of path loss estimates
  $\hat{L}(u, u_{sens(1)})$ to $\hat{L}(u, u_{sens(N)})$ at candidate position u with respect to a radio sensor device at a corresponding known position and NF is the noise floor at each radio sensor device; computing a function $$J(u, P_{Tx}) = \sum_{n=1}^{N_{seq}} [\|r1_n - \hat{r}\|^2 + \ldots + \|rP_n - \hat{r}\|^2]$$

for each candidate position u and candidate transmit power $P_{Tx}$, where $\{r1n\}, \ldots, \{rPn\}$, n=1, ..., Nseq, are receive signal strength observations on P antennas of each of the plurality of radio sensor devices; and selecting the candidate position that minimizes the function $J(u, P_{Tx})$ over all candidate positions and transmit powers.

45. The method of claim 44, wherein selecting comprises selecting the candidate position in the candidate position/transmit power pair that minimizes the function $J(u, P_{Tx})$.

46. The method of claim 45, and further comprising generating one or more candidate transmit powers based on prior estimated positions of the target device.

47. The method of claim 46, wherein generating comprises generating one or more candidate transmit powers by storing candidate transmit powers for prior estimated positions of the target device, computing a median candidate transmit power from the stored candidate transmit powers for prior estimated positions, and providing a set of candidate transmit powers based on the median.

48. The method of claim 47, wherein generating comprises generating a set of candidate transmit powers by providing a plurality of transmit powers that progressively deviate from the median by a desired amount.

49. A method for determining a position of a target device based on data pertaining to strength of an emission received from the target device at a plurality of known positions, the method comprising:
  a. receiving an emission from the target device at each of a plurality of known positions to produce receive signal strength data; and
  b. computing a most likely position over a plurality of candidate positions, a plurality of path loss models and a plurality of candidate transmit powers of the target device based on the receive signal strength data, wherein computing comprises computing a position estimate of the target device by, for each candidate position and for a range of candidate transmit powers $P_{Tx}$ of the target device: computing $\hat{r} = 10 \log_{10}[10^{0.1(P_{Tx} \cdot 1 - L1)} + 10^{0.1 \cdot NF}]$, where
  $L1 = [\hat{L}(u, u_{sens(1)}), \ldots, \hat{L}(u, u_{sens(N)})]^T$ is a matrix composed of path loss estimates
  $\hat{L}(u, u_{sens(1)})$ to $\hat{L}(u, u_{sens(N)})$ at candidate position u with respect to a radio sensor device at a corresponding known position and NF is the noise floor at a radio sensor device deployed at a corresponding known position; computing a function $$J(u, P_{Tx}) = \sum_{n=1}^{N_{seq}} [\|r1_n - \hat{r}\|^2 + \ldots + \|rP_n - \hat{r}\|^2]$$

for each candidate position u and candidate transmit power $P_{Tx}$, where $\{r1n\}, \ldots, \{rPn\}$, n=1, ..., Nseq, are receive signal strength observations on P antennas of each of the plurality of radio sensor devices; selecting a set of candidate position/candidate transmit power pairs that are the N minimum of the function $J(u, P_{Tx})$; and selecting the candidate position/transmit power pair in the set of candidate position/candidate transmit power pairs that minimizes an absolute value of the difference between the candidate transmit power and a median of candidate transmit powers for the target device at prior estimated positions, wherein the candidate position in the selected candidate position/candidate transmit power pair is the position estimate of the target device.

50. The method of claim 49, and further comprising storing candidate transmit powers for prior estimated positions of the target device and computing the median candidate transmit power from the stored candidate transmit powers for prior estimated positions of the target device.

51. A method for determining a position of a target device based on data pertaining to strength of an emission received from the target device at a plurality of known positions, the method comprising:
  a. receiving an emission from the target device at each of a plurality of known positions to produce receive signal strength data, wherein the known positions are on each of the floors of a multi-storing building;
  b. deriving received power data at each known position from the received radio emissions, where P(f,k) is the power received from the target device at the kth known position on floor f; and
  c. computing a most likely position over a plurality of candidate positions and a plurality of candidate transmit powers of the target device based on the receive signal strength data, wherein computing comprises computing an average power per known position per floor $P_{avg}(f) = \Sigma_k P(f,k)/N(f)$, wherein N(f) is the number of known positions on floor f, and estimating that the target device is on floor $f_0$, where $f_0$ maximizes $P_{avg}(f)$ over f.

52. A method for generating path loss estimate data associated with an area in which a plurality of radio sensor devices are deployed at known positions and used to determine a position of a target device in the area based on emissions received from the target device, the method comprising:
   a. with respect to a test signal transmitted by each radio sensor device, measuring path loss at each of the other radio sensor devices to measure the path loss between all combinations of pairs of radio sensor devices;
   b. for each radio sensor device, deriving parameters for a path loss model function by minimizing a mean squared error between the measured path loss between a radio sensor device and each of the other radio sensor devices and the path loss model function between that radio sensor device and each of the other radio sensor devices; and
   c. computing a path loss estimate between a position and each radio sensor device by evaluating the path loss model function using the parameters derived for each radio sensor device.

53. The method of claim 52, wherein deriving comprises computing a minimum of a square of a norm of a difference between a vector representing measured path loss between a radio sensor device and each of the other radio sensor devices and a vector representing the path loss model function based on corresponding distances between the radio sensor device and each of the other radio sensor devices.

54. A system for determining a position of a target device based on data pertaining to strength of an emission received from the target device at a plurality of known positions, the system comprising:
   a. a plurality of radio sensor devices at known positions within in an area, each radio sensor device capable of receiving radio emissions; and
   b. a computing device coupled to the plurality of radio sensor devices and receive data therefrom that represents strength of signals received by the radio sensor devices from the target device, wherein the computing device estimates a most likely position of the target device over a plurality of candidate positions, a plurality of path loss models and a plurality of candidate transmit powers of the target device based on the receive signal strength data, wherein said computing device computes the most likely position by minimizing over the plurality of path loss models.

55. A method for determining the position of a target device that emits radio signals in a multi-story building, comprising:
   a. deploying a plurality of radio sensor devices at known positions on each of the floors of a multi-storing building;
   b. receiving radio emissions from the target device at the plurality of radio sensor devices and deriving received power data at each radio sensor device from the received radio emissions, where P(f,k) is the power received from the target device at the kth sensor on floor f;
   c. computing an average power per sensor per floor $P_{avg}(f) = \Sigma_k P(f,k)/N(f)$, wherein N(f) is the number of sensors on floor f; and
   d. estimating that the target device is on floor $f_0$, where $f_0$ maximizes $P_{avg}(f)$ over f.

56. A method for generating path loss estimate data associated with an area in which radio emissions are received from a target device at a plurality of known positions to determine a position of the target device in the area, the method comprising:
   a. with respect to a test signal transmitted by from each known position, measuring path loss at each of the other known positions to measure the path loss between all combinations of pairs of known positions;
   b. evaluating a path loss model based on the distance between all combinations of pairs of known positions to produce path loss model data;
   c. computing, relative to each known position, a path loss error between the measured path loss and the path loss model data when the path loss is measured at each of the other known positions relative to that known position;
   d. interpolating a path loss error relative to each known position at a candidate position from the corresponding computed path loss errors using a multi-dimensional interpolation technique;
   e. computing a path loss estimate between a candidate position and each known position by adding the interpolated path loss error relative to a known position at the candidate position to path loss data obtained by evaluating the path loss model based on a distance between a known position and the candidate position; and
   f. computing a most likely position of the target device over the plurality of candidate positions.

* * * * *